Figure 1:
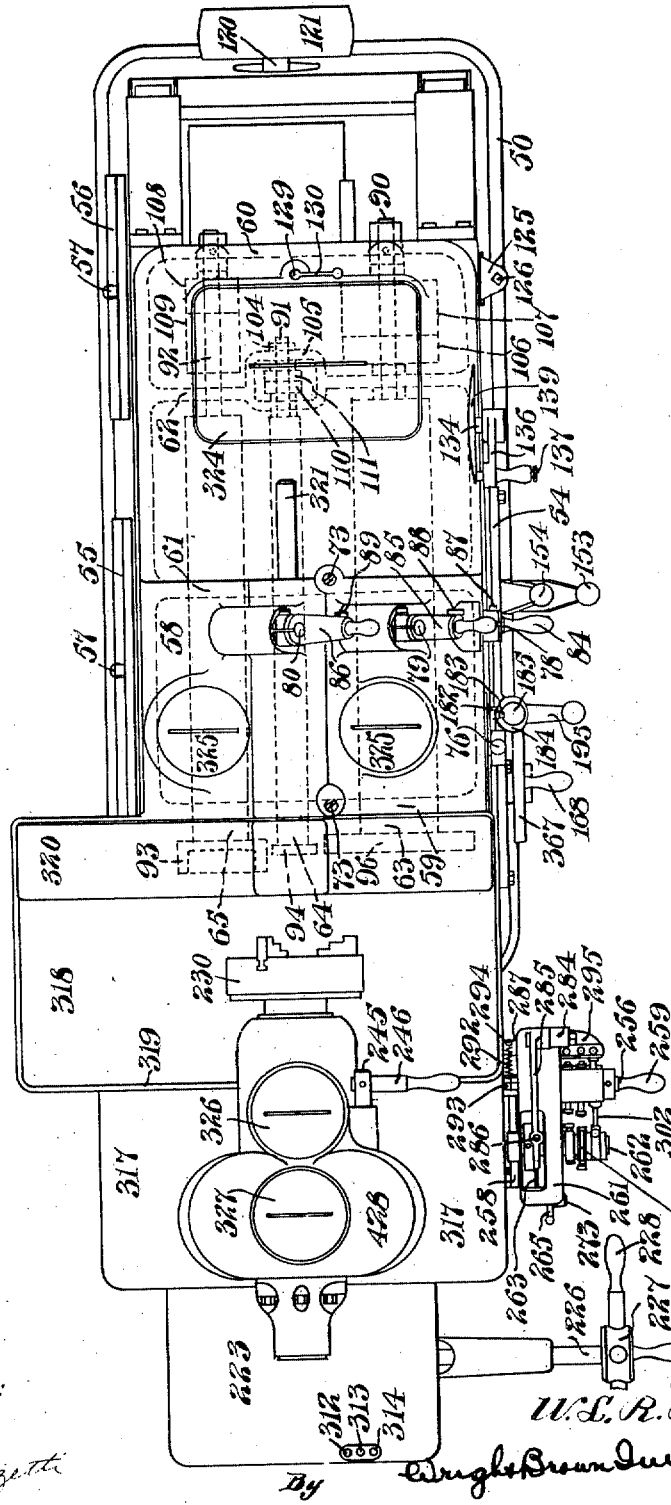

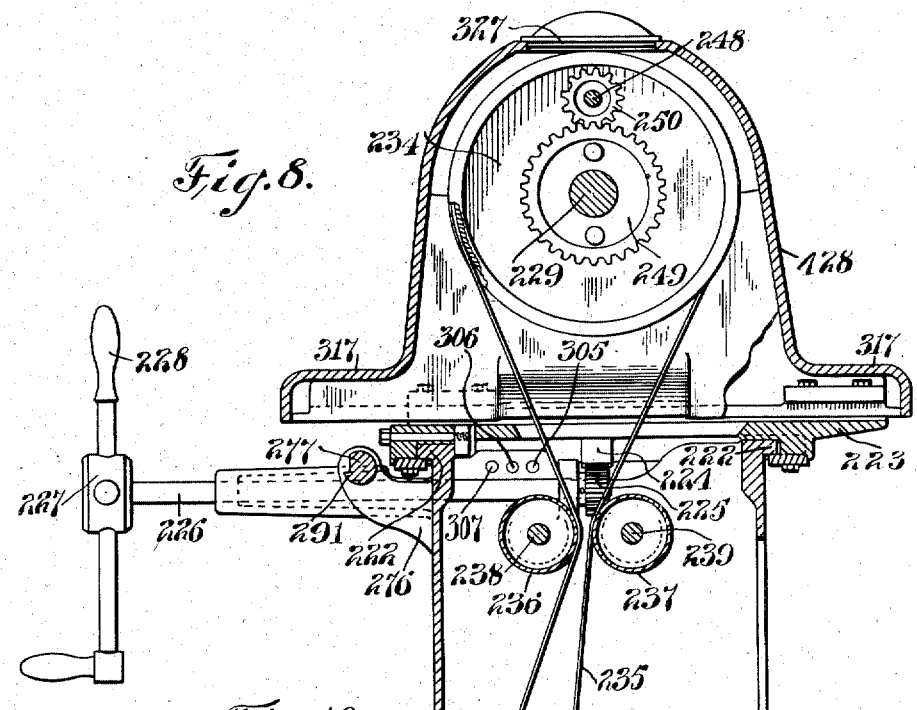
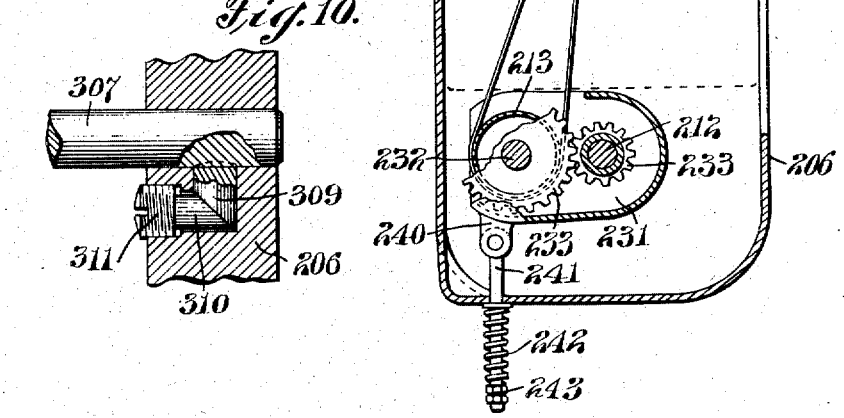
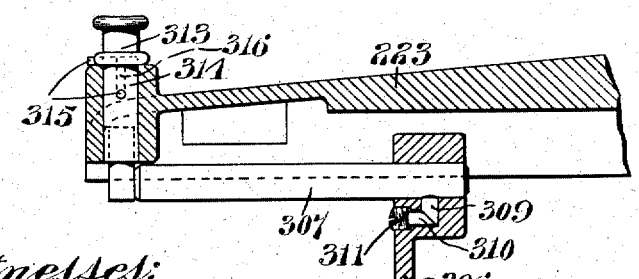

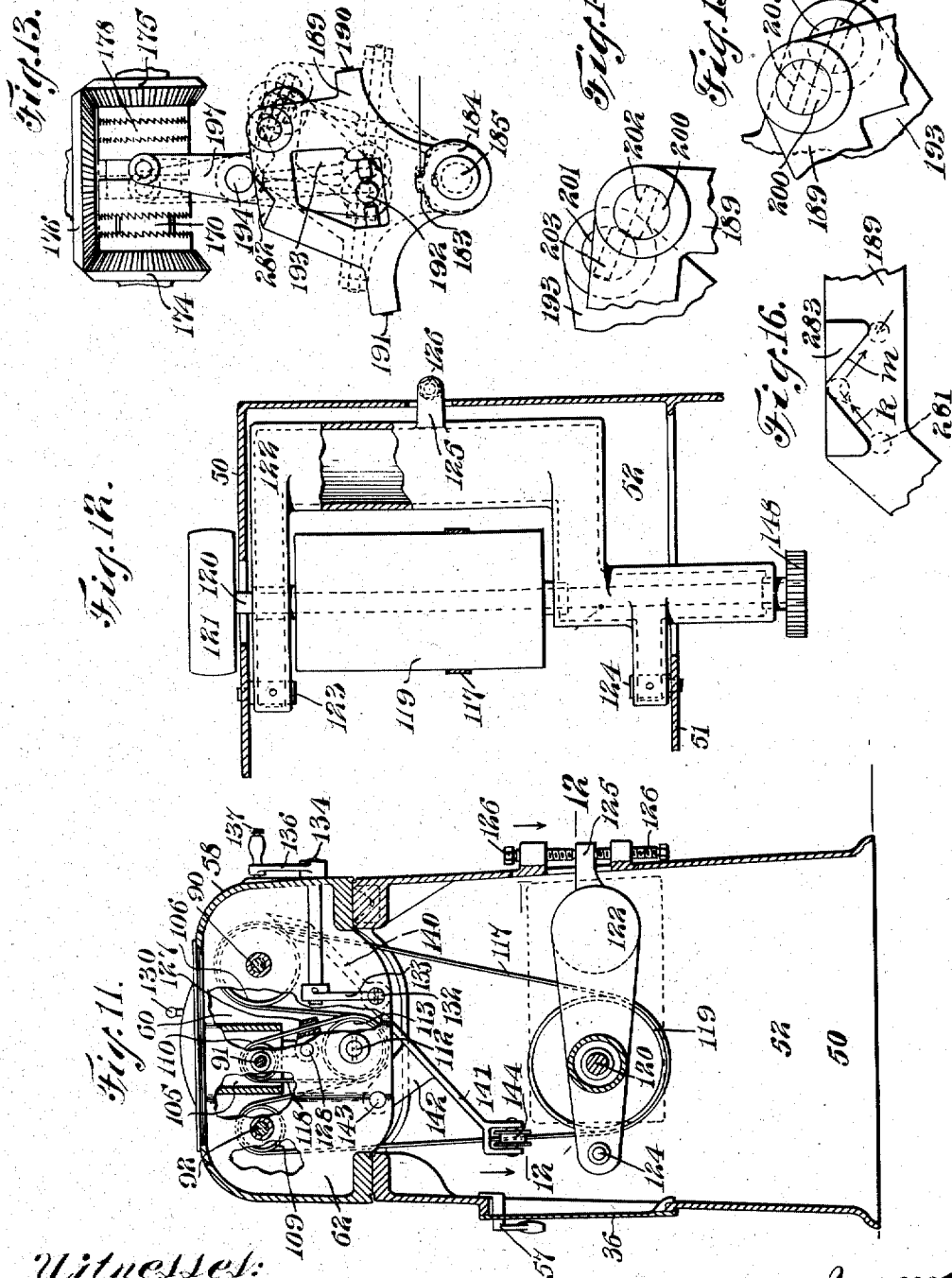

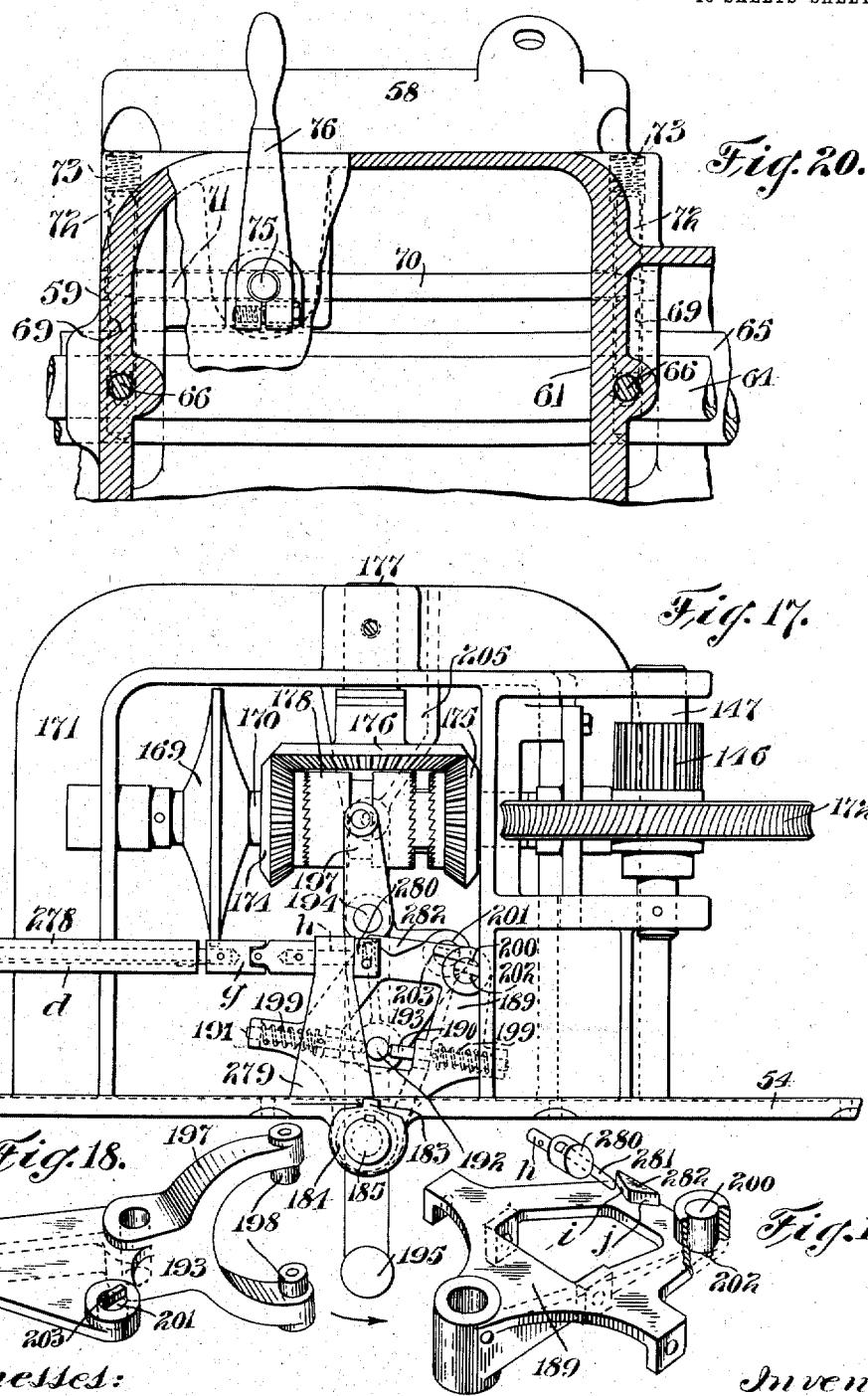

W. LE R. BRYANT.
MULTISPINDLE GRINDING MACHINE.
APPLICATION FILED OCT. 21, 1909.

983,975.

Patented Feb. 14, 1911.
16 SHEETS—SHEET 11.

Witnesses:
H. L. Allen
P. W. Pezzetti

Inventor:
W. Le R. Bryant,
By Wright Brown Quinby May
Attys.

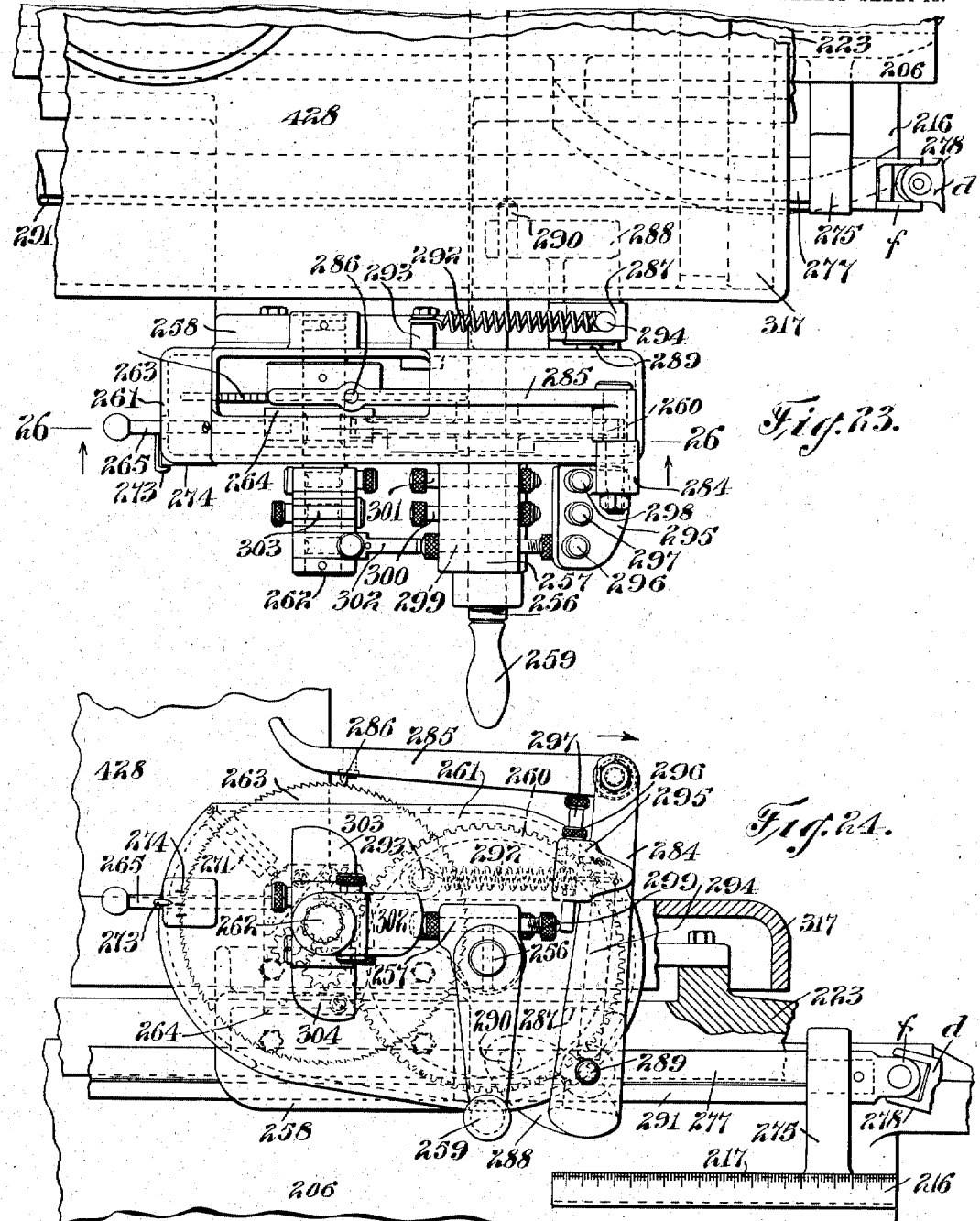

W. LE R. BRYANT.
MULTISPINDLE GRINDING MACHINE.
APPLICATION FILED OCT. 21, 1909.
983,975.
Patented Feb. 14, 1911.
16 SHEETS—SHEET 13.
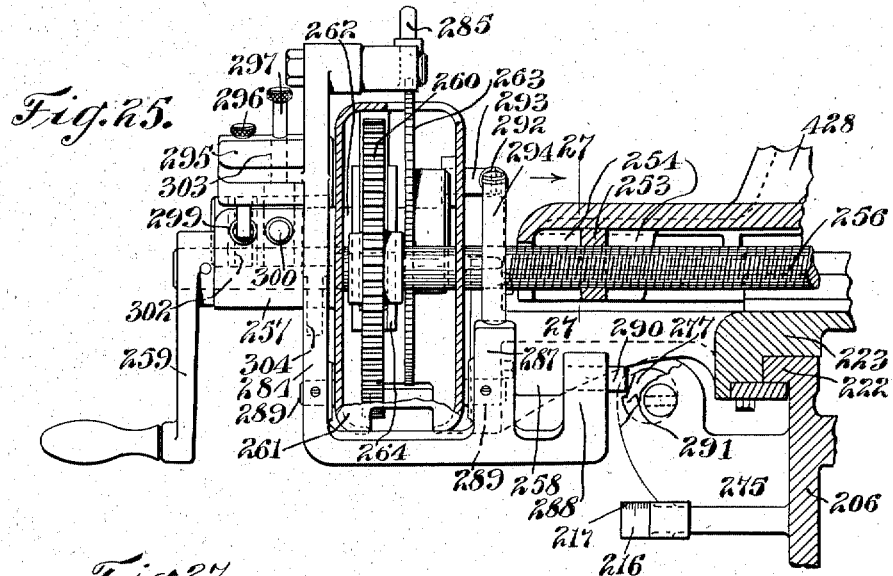
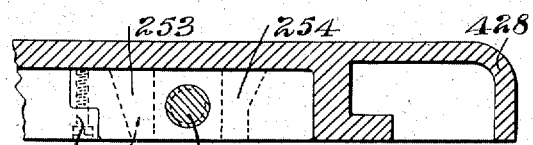
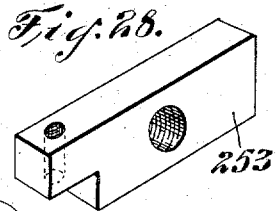
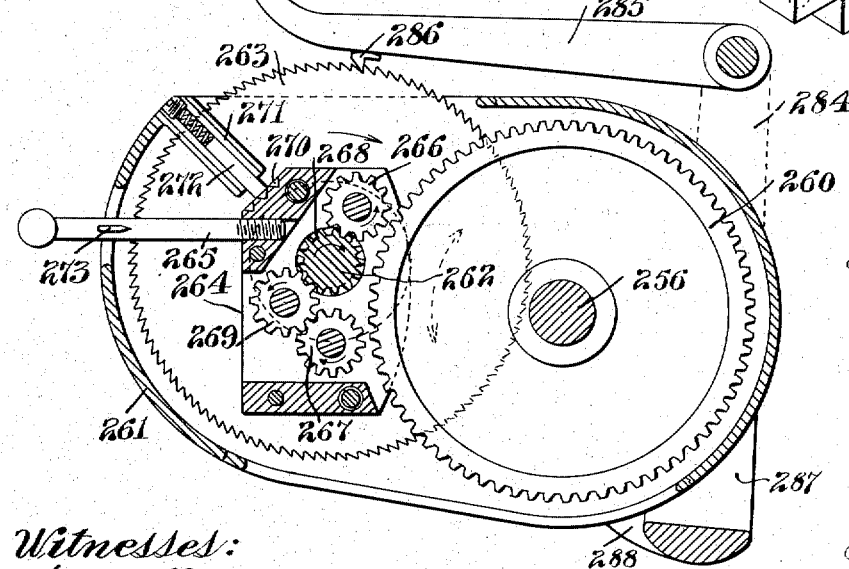
Witnesses:
H. L. Allen
P. W. Pizzetti
Inventor:
W. L. R. Bryant;
By Wright Brown Quinby May
Attys W. LE R. BRYANT.
MULTISPINDLE GRINDING MACHINE.
APPLICATION FILED OCT. 21, 1909.
983,975.
Patented Feb. 14, 1911.
16 SHEETS—SHEET 14.
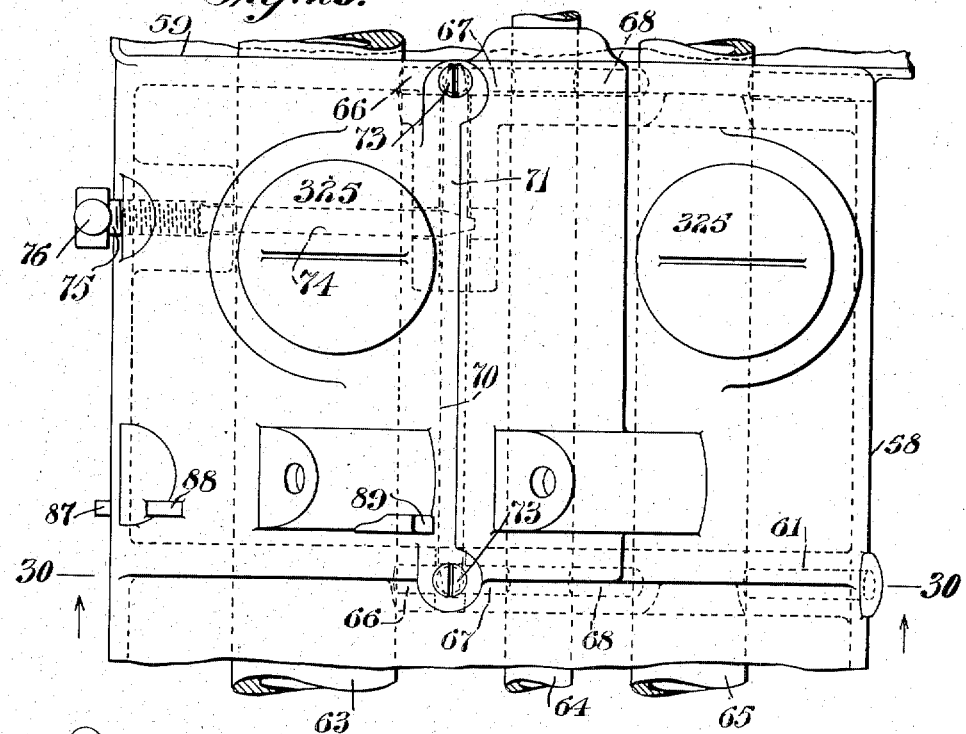
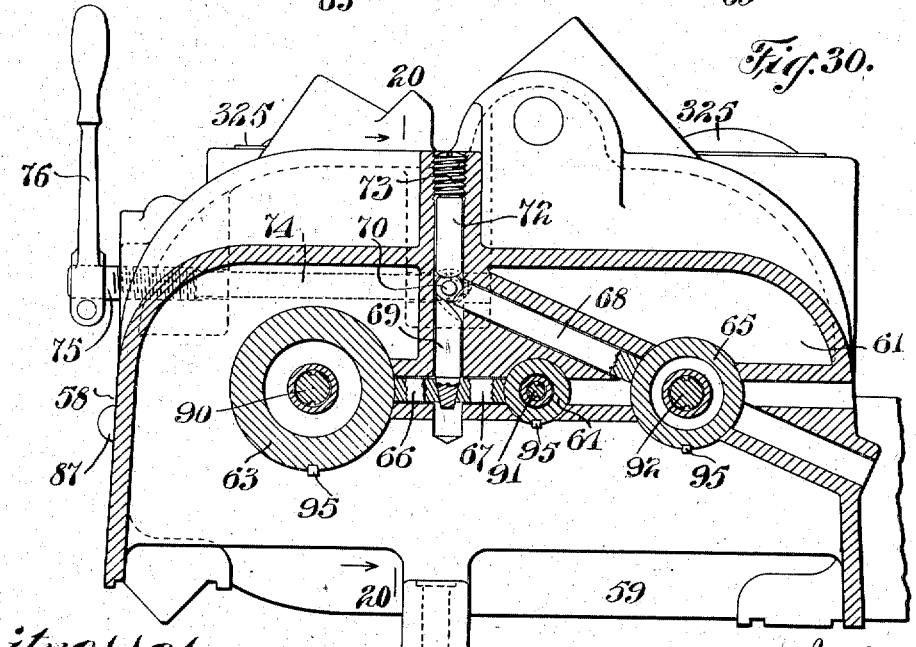

W. LE R. BRYANT.
MULTISPINDLE GRINDING MACHINE.
APPLICATION FILED OCT. 21, 1909.
983,975.
Patented Feb. 14, 1911.
16 SHEETS—SHEET 15.
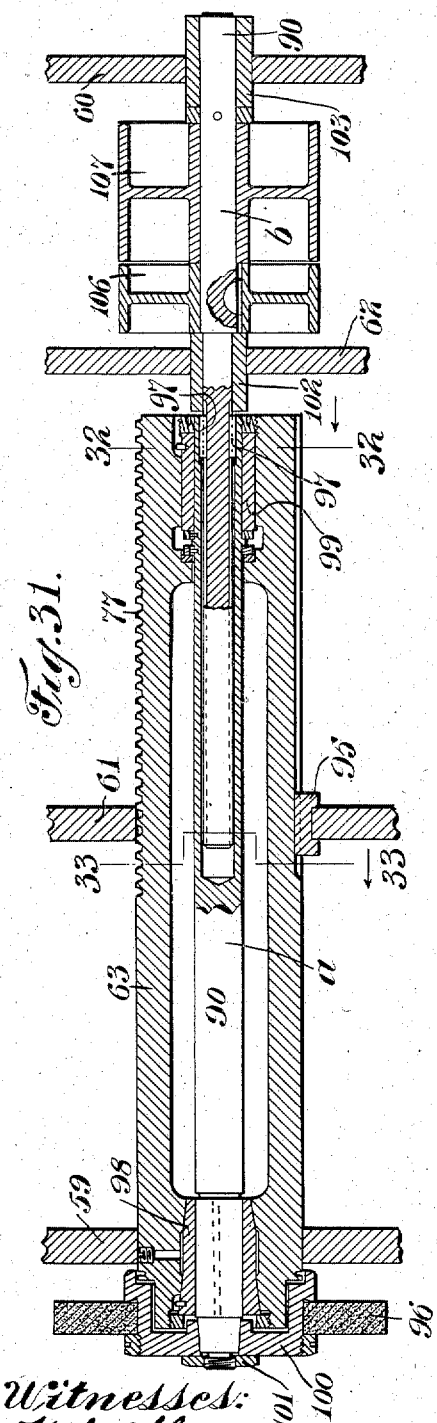
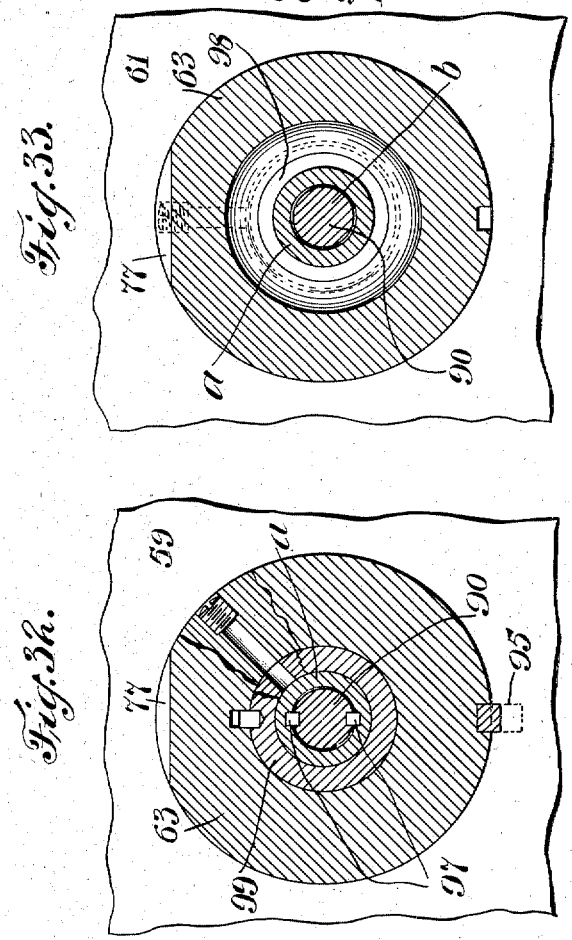
Witnesses:
H. L. Allen
P. H. Pizzetti
Inventor:
W. Le R. Bryant,
By Wright Brown Quinby May
Attys.

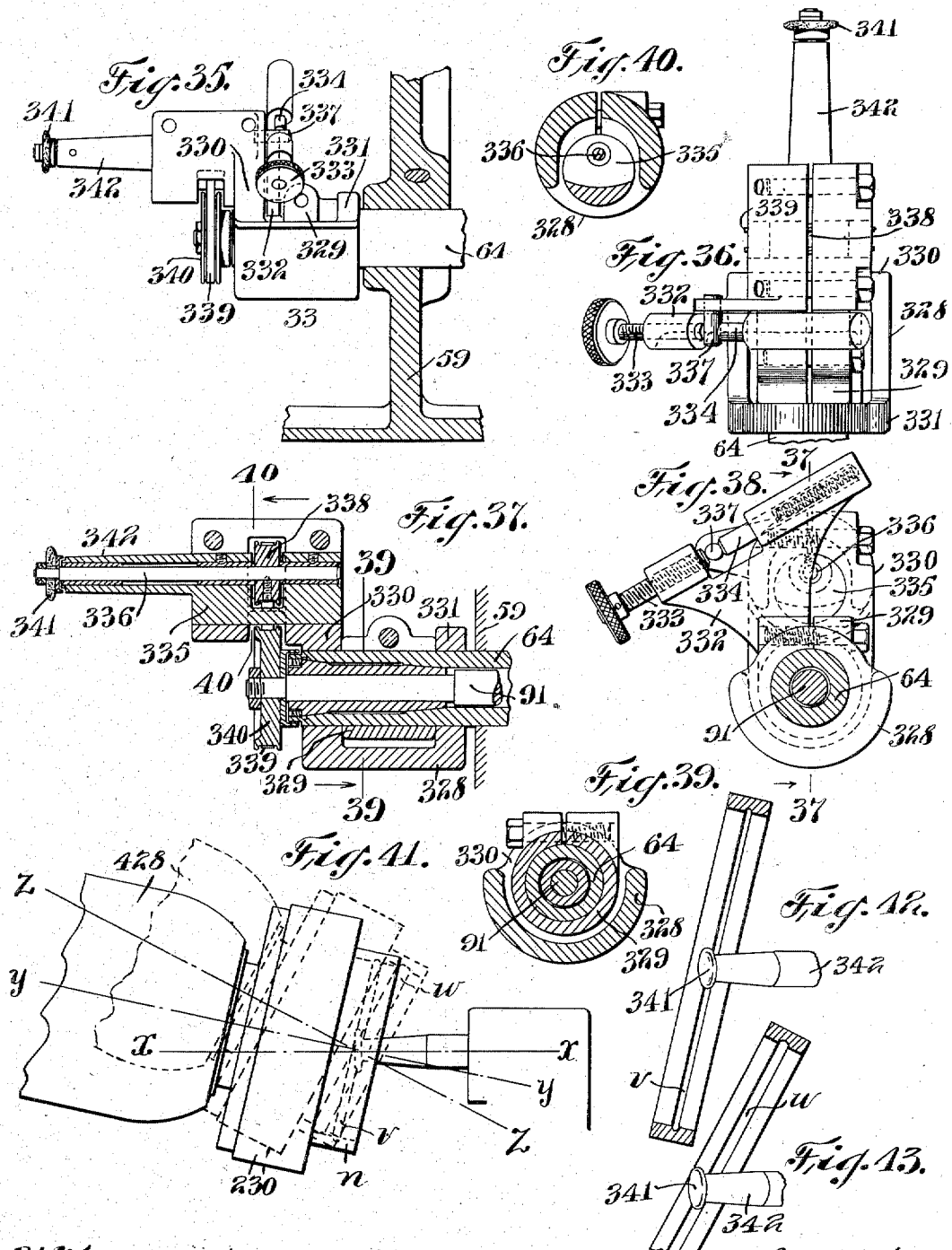

UNITED STATES PATENT OFFICE.

WILLIAM LE ROY BRYANT, OF SPRINGFIELD, VERMONT.

MULTISPINDLE GRINDING-MACHINE.

983,975.   Specification of Letters Patent.   Patented Feb. 14, 1911.

Application filed October 21, 1909.   Serial No. 523,909.

*To all whom it may concern:*

Be it known that I, WILLIAM LE ROY BRYANT, of Springfield, in the county of Windsor and State of Vermont, have invented certain new and useful Improvements in Multispindle Grinding-Machines, of which the following is a specification.

This invention has relation to multi-spindle grinding machines of the general character of that illustrated and described in Letters Patent No. 925,867, granted to me June 22, 1909.

The general object of the invention is to produce a practical machine capable of operating upon work formed of either hard or relatively soft metal, for the purpose of removing the surplus metal by abrasion instead of by cutting, and of leaving a fine finish on the surface of the work.

More particularly the object of the present invention is to provide certain improvements on the machine shown in the patent referred to, by which it is simplified in construction, and rendered more efficient and accurate in operation. For instance I dispense with the rotation of the tool support, and thus am able to use a sliding carriage in which the tool spindles are journaled, thereby simplifying the tool slide and the parts connected therewith. In order to secure a cross feed, however, which in the previous machine was accomplished by the rotation of the turret, I employ mechanism for moving the work holder transversely with reference to the axes of the tool spindles. This is in addition to the manually-operated means by which the work carriage or support may be moved by hand to properly position the work with reference to the particular tool which is to operate thereupon. By the elimination of the rotatory support for the tool spindles, I am able to secure a greater stability and rigidity of construction and at the same time secure a greater efficiency of the mechanism by which the tool spindles are rotated. In addition to the improvements which I have thus briefly noted, the present invention includes a number of others, all of which are illustrated upon the drawings, described in the following specification, and pointed out in the appended claims.

Figure 2:
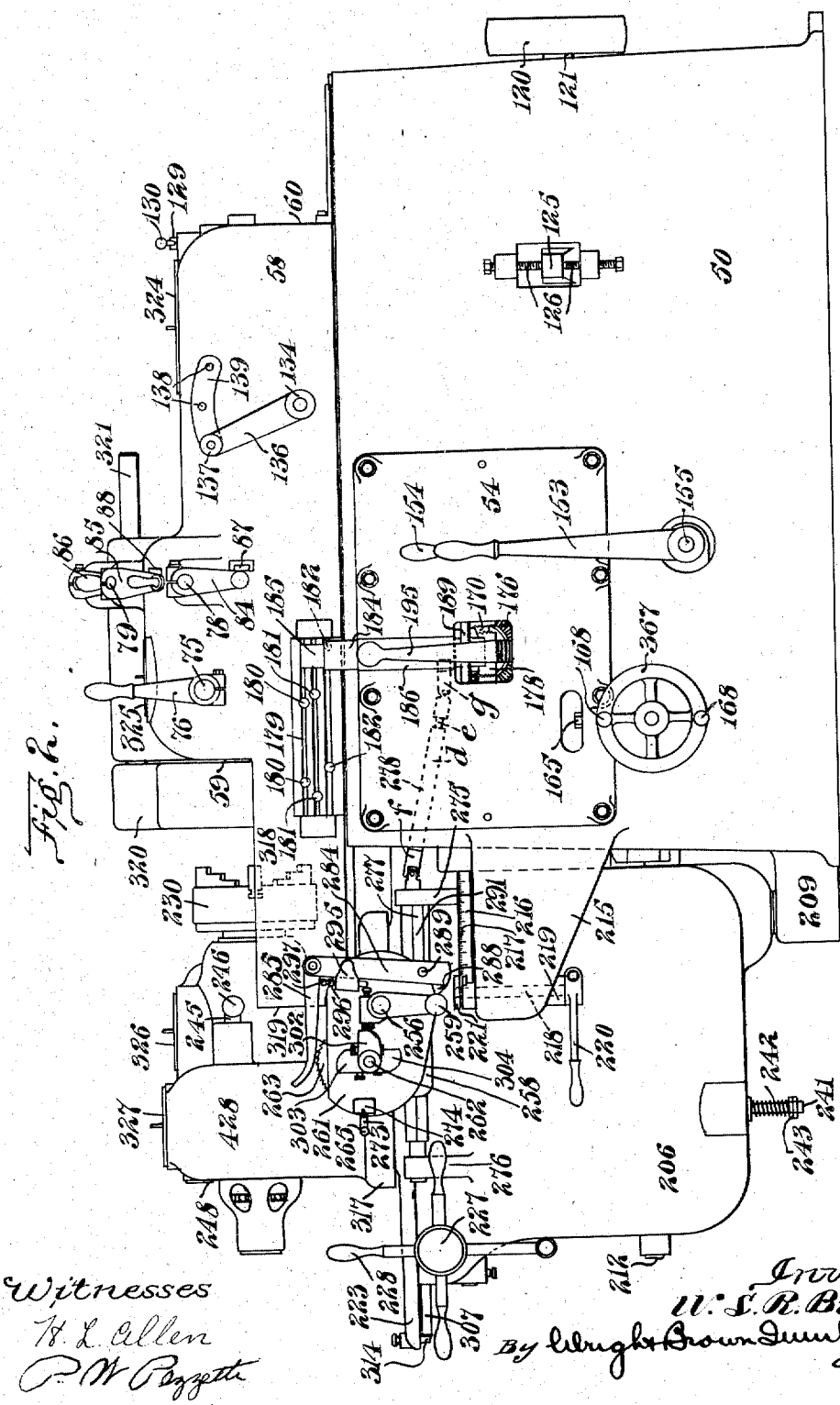
Figure 3:
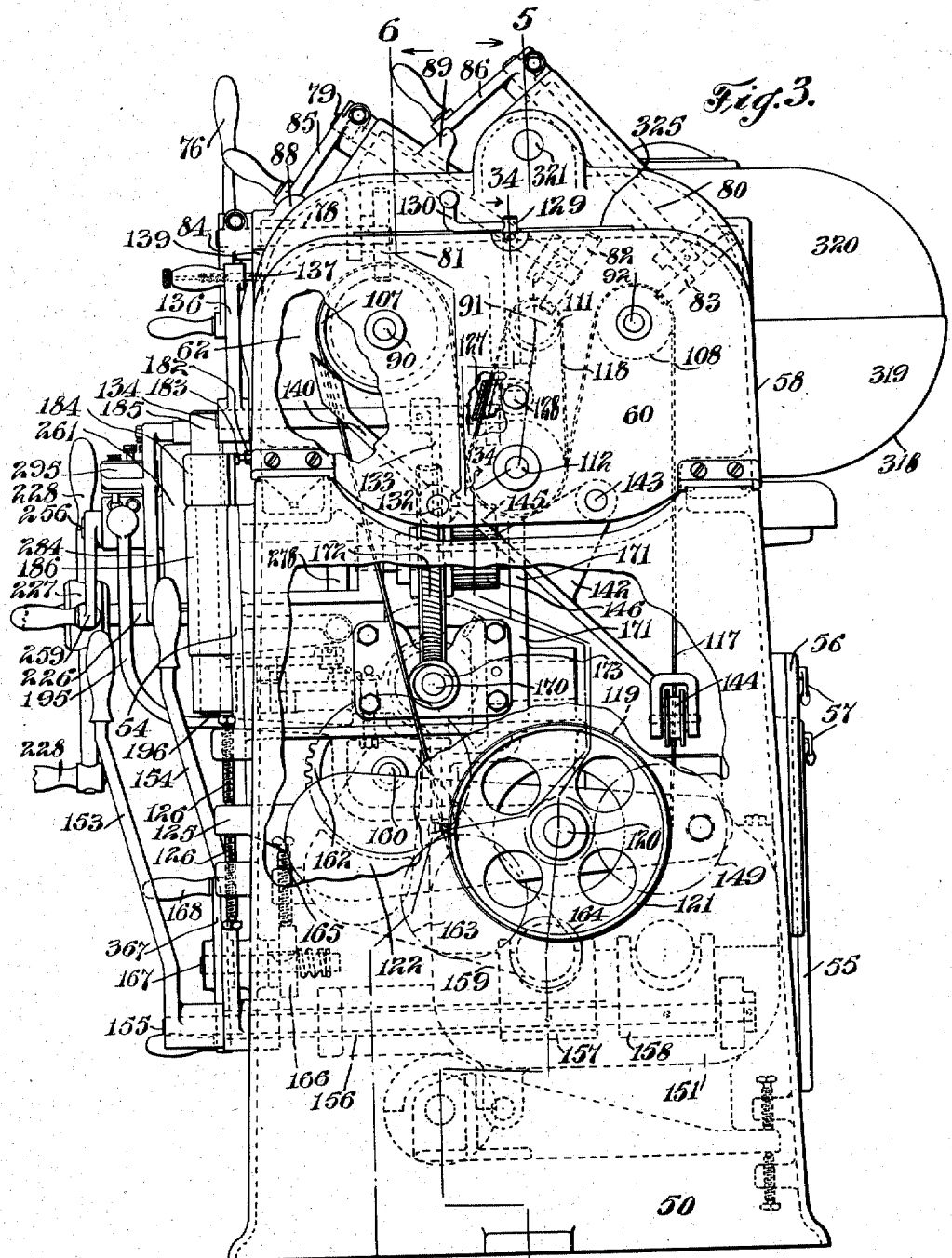
Figure 4:
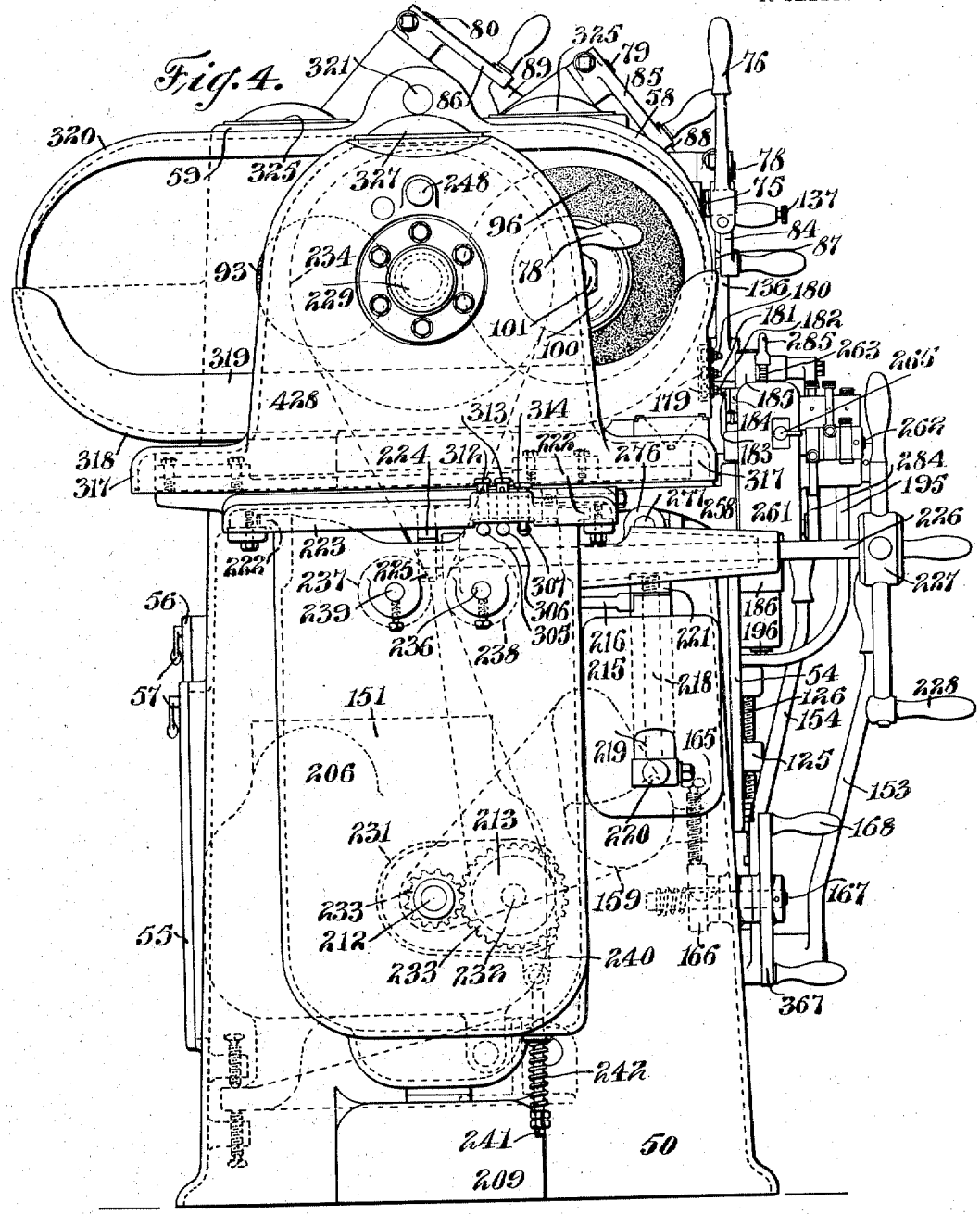
Figure 5:
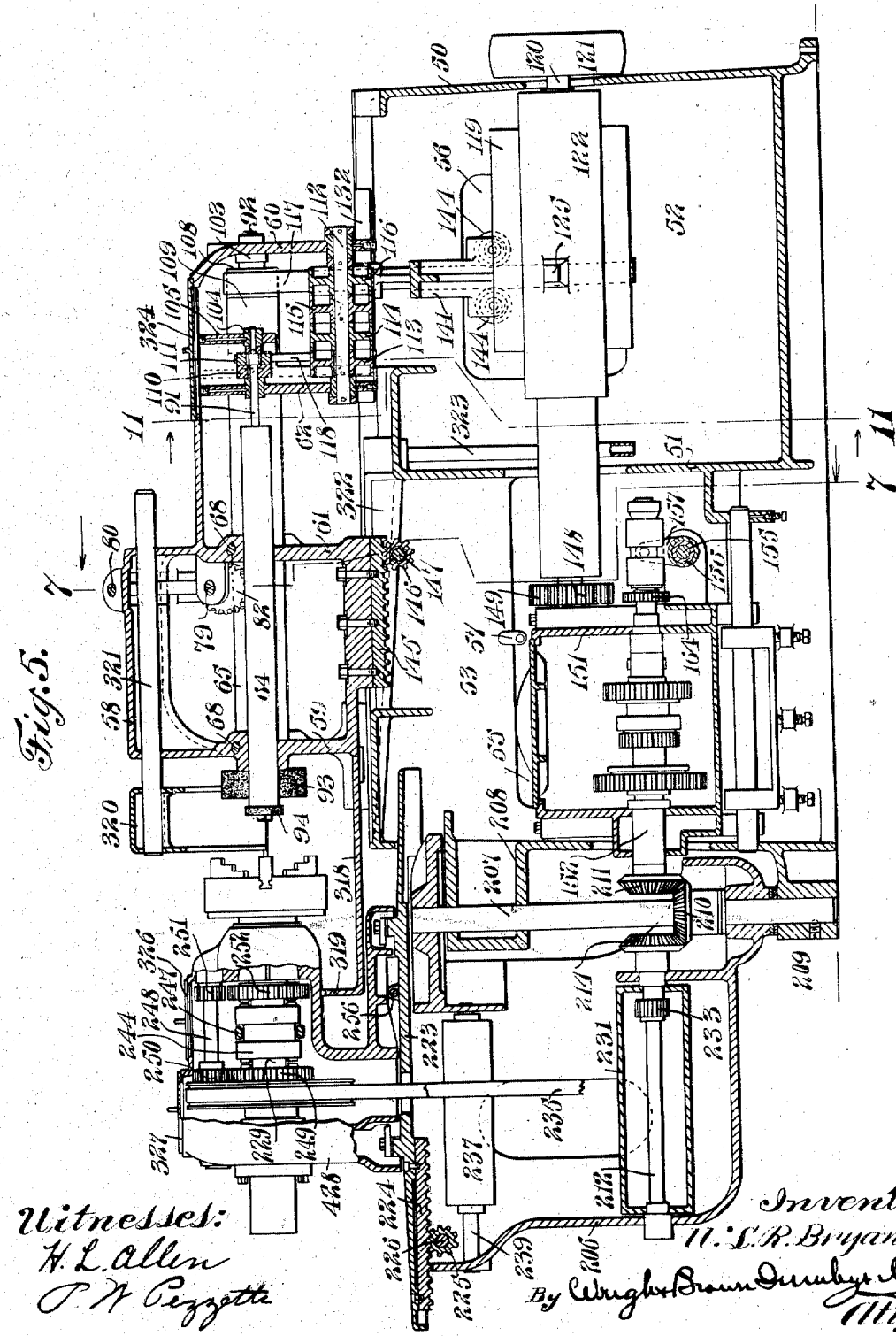
Figure 6:
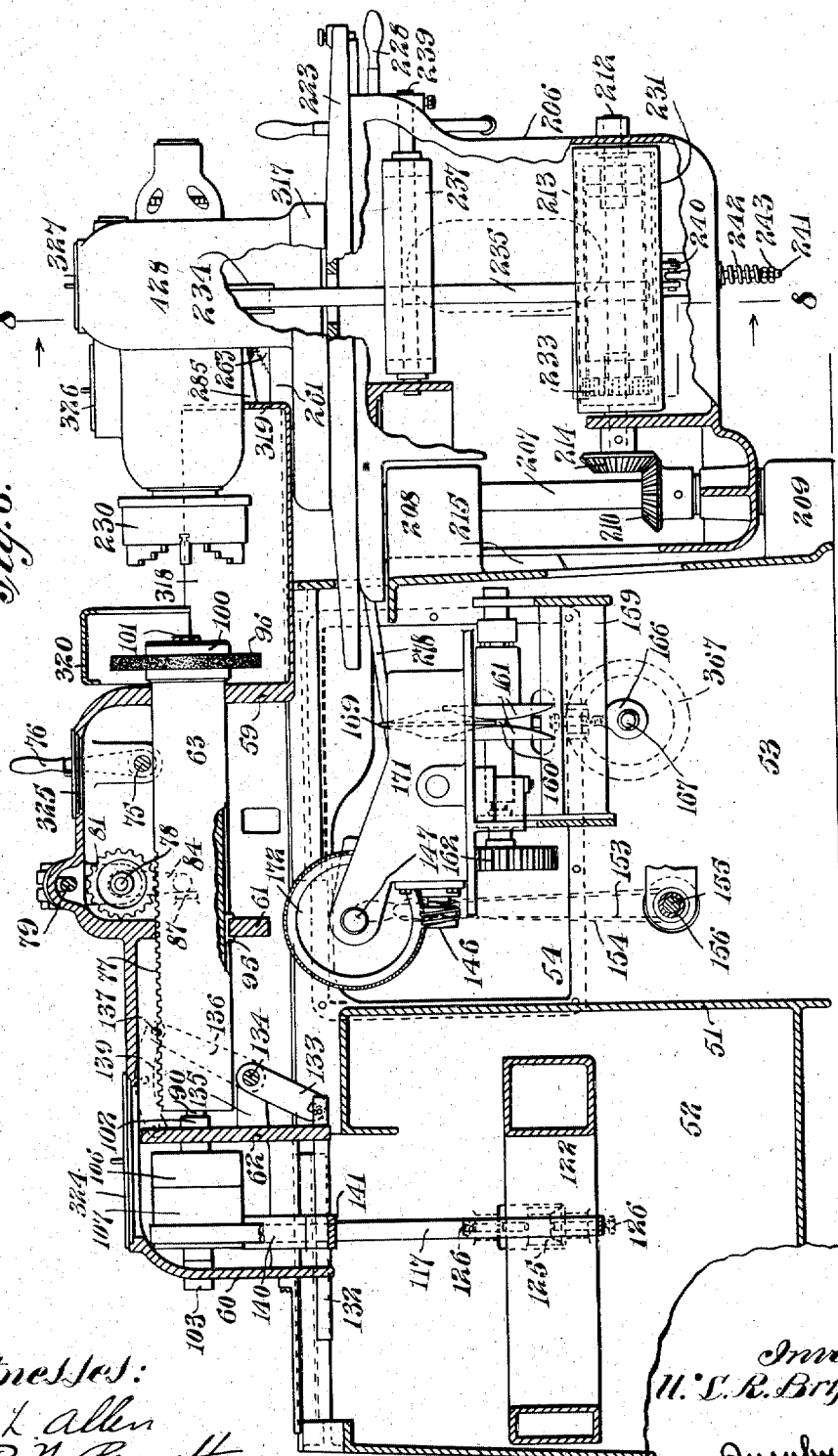
Figure 7:
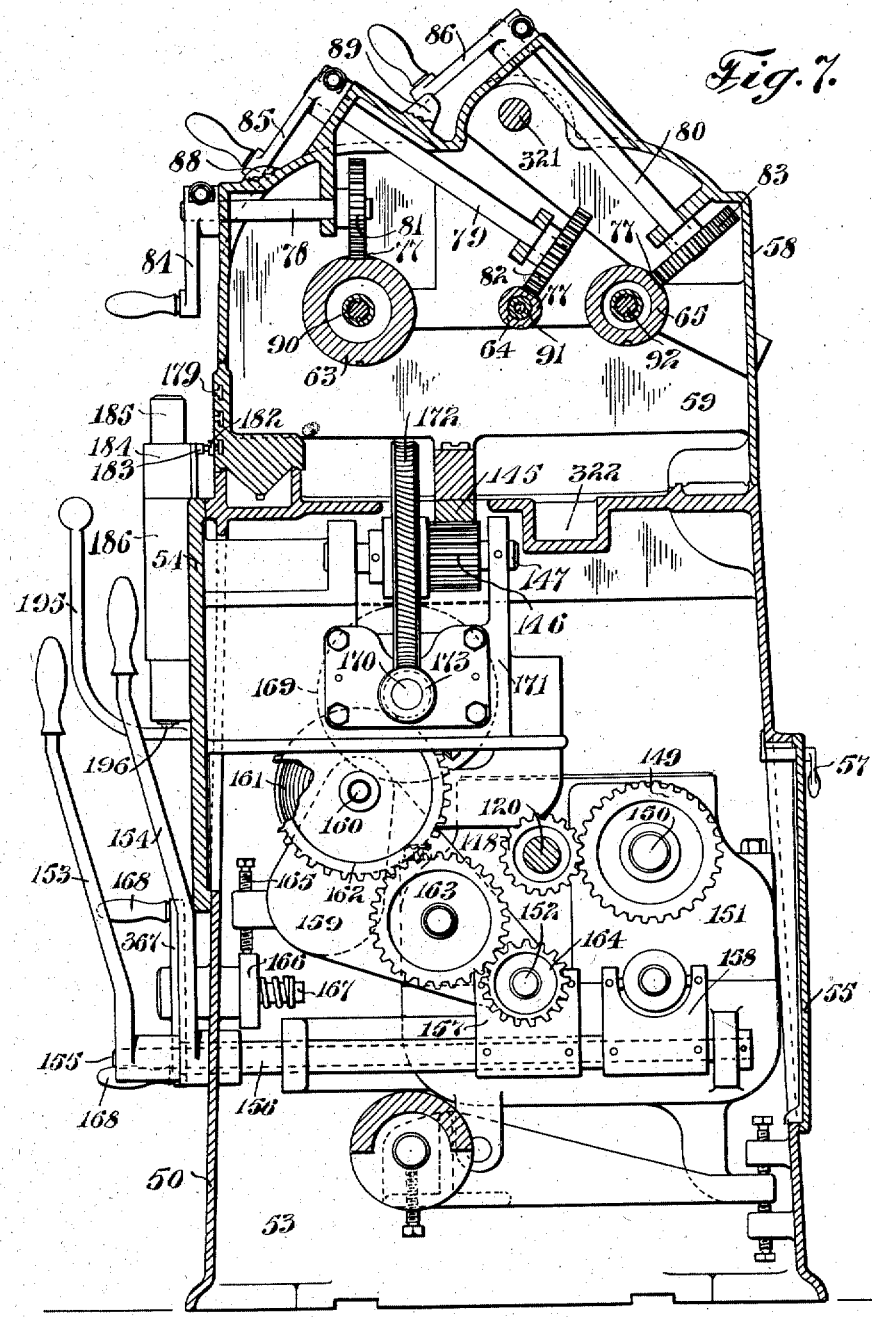
Figure 22:
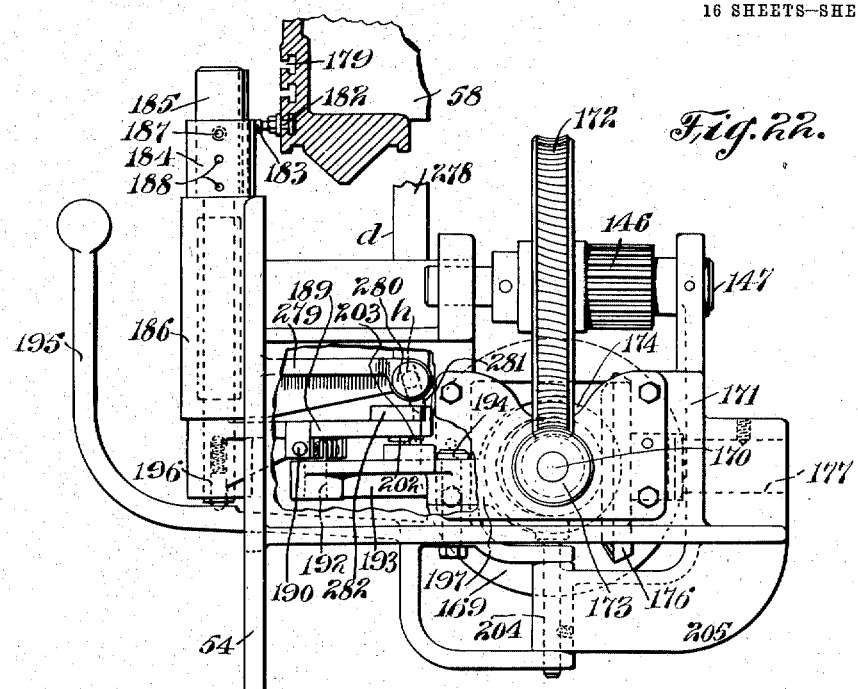
Figure 21:
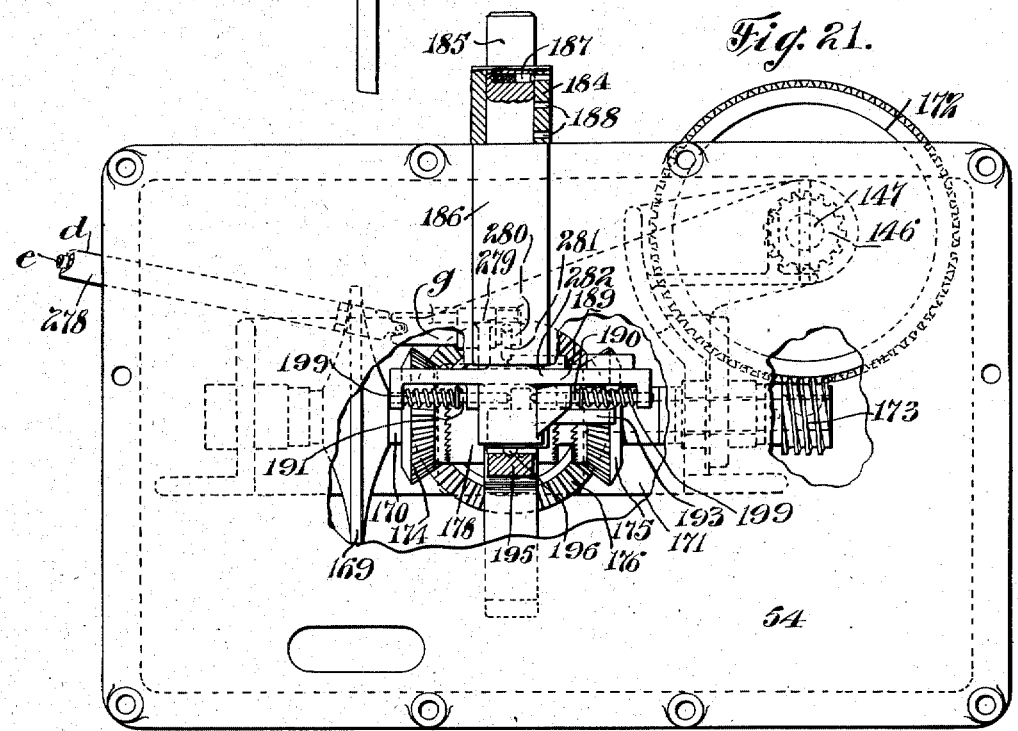

Referring to the accompanying drawings, which illustrate one embodiment of the invention, to the details of construction of which the invention is not limited however,—Figure 1 represents in plan view my improved multi-spindle metal working machine. Fig. 2 represents a front elevation of the same. Fig. 3 represents the right end elevation of the machine. Fig. 4 represents the left end elevation of the machine. Fig. 5 represents a section on the line 5—5 of Fig. 3, looking in the direction of the arrow. Fig. 6 represents a longitudinal section on the line 6—6 of Fig. 3. Fig. 7 represents a vertical transverse section on the line 7—7 of Fig. 5. Fig. 8 represents a section on the line 8—8 of Fig. 6, and illustrates the means for driving the work holder. Fig. 9 illustrates in section a portion of the table or slide on which the work carriage is mounted and illustrates stops used for limiting the movement of the slide or table. Fig. 10 is a detail view illustrating one of the stops or abutments shown in the last-mentioned figure. Fig. 11 represents a section on the line 11—11 of Fig. 5, and illustrates the power-transmitting mechanism for rotating the tool spindles. Fig. 12 is a fragmentary view partially in section on the line 12—12 of Fig. 11, and illustrates the main driving shaft, the drum thereon for imparting movement to the belts which drive the work spindles, and the frame in which the main driving shaft is journaled. Fig. 13 is a detail view of a portion of a power-transmitting mechanism located in the bed of the machine and illustrates the clutch and the clutch-operating mechanism. Figs. 14 and 15 are fragmentary views illustrating means employed for effecting a quick actuation of the clutch. Fig. 16 represents a slight modification of the cam which controls the cross feed of the work support. Fig. 17 is a more complete view of the mechanism shown in Fig. 13, giving a plan view of the clutch-shifting mechanism and a portion of the power-transmitting mechanism which effects the actuation of the cross-feeding mechanism for the work holder. Fig. 18 illustrates the yoke lever which shifts the clutch shown in Fig. 17. Fig. 19 illustrates the lever by which power is imparted to the clutch-shifting lever. Fig. 20 represents a partial side elevation and a partial section on the line 20—20 of Fig. 30, and illustrates in part the means employed for locking the sleeves, bolsters or quills of the work spindles after they have been adjusted in proper position with reference to the work. Fig. 21 illustrates in front elevation the clutch and power-transmitting mechanisms shown in Fig. 17. Fig. 22 represents a right end elevation of the same. Fig. 23 represents in plan view a portion of the work-supporting mechanism, and illustrates the cross-feeding mechanism for the work support. Fig. 24 represents a front elevation of the same. Fig. 25 represents a transverse section through a portion of the machine to illustrate the cross-feeding mechanism. In this view, most of the parts are shown as they appear in elevation. Fig. 26 represents a section on the line 26—26 of Fig. 23. Fig. 27 represents a section on the line 27—27 of Fig. 25, and illustrates the feed nut for the work support. Fig. 28 illustrates the feed nut shown in Fig. 27. Fig. 29 represents in plan view a portion of the tool slide. Fig. 30 represents a section on the line 30—30 of Fig. 29. Fig. 31 illustrates one of the tool spindles and the quill, sleeve or bolster in which it is mounted. Fig. 32 illustrates a section on the line 32—32 of Fig. 31. Fig. 33 represents a section on the line 33—33 of Fig. 31. Fig. 34 is a small detail view, being a section on the line 20—20 of Fig. 3, and shows a portion of the tool power-transmitting mechanism for the tool spindles. Fig. 35 illustrates in front elevation an attachment for one of the spindles for the purpose of securing an additional feed or adjustment of a tool, preferably a vertical adjustment, in consequence of which the tool may be employed for grinding internal curved surfaces as for instance ball races etc. Fig. 36 illustrates a plan view of the same. Fig. 37 represents a vertical longitudinal section through the same on the line 37—37 of Fig. 38. Fig. 38 represents an end elevation of the attachment and is a projection from Fig. 37 and Fig. 36. Fig. 39 represents a section on the line 39—39 of Fig. 37. Fig. 40 represents a section on the line 40—40 of Fig. 37. Fig. 41 shows in plan view how the grinding tool may be utilized for grinding internal curved surfaces of varying radii. Figs. 42 and 43 represent views illustrating the work in different positions with reference to the grinding tool.

Before proceeding to describe the machine which I have selected as best embodying my invention, I desire to have it understood that the machine is not the only embodiment to which the invention is capable, that a wide range of equivalents may be employed for the parts which I have illustrated and will hereinafter describe, that the phraseology which I have adopted is for the purpose of description and not of limitation except where the sense absolutely requires it, that the parts will be of the necessary size and relationship and properly mounted and supported according to the tenets of machine construction, and that many of the parts are conventionally shown.

The machine as a whole comprises a bed upon which the tool slide is mounted on ways so as to be movable longitudinally of the bed for effecting the length feeds of the tool. The tools, which consist of grinding wheels of different sizes, shapes and abrading qualities, are mounted upon extensible spindles which are journaled in sleeves, bolsters or supports supported in the tool slide. By means of suitable power-transmitting mechanism which may be operated by hand, the tool, which is selected for operation upon the work, may be advanced beyond the others so as to bring it into proper relation to the work, after which the tool will be fed lengthwise by the slide-feeding mechanism. The tool spindles are driven by suitable power-transmitting mechanism, which in the present machine takes the form of a driving drum and belts which engage pulleys on the spindles. Each spindle is equipped with a fast and loose pulley, and, by the aid of belt-shifting mechanism, any one of the tool spindles may be selected for rotation, the others remaining in a state of rest or non-rotation. The work support or holder takes the form of a chuck and chuck spindle which is mounted in a carriage, and mechanism is provided for effecting transverse feeds of the carriage. The carriage itself is slidingly supported upon a slide which is movable in a direction at right angles to the path of movement of the carriage, in consequence of which the carriage is movable both longitudinally and transversely of the machine. In addition thereto, the slide is mounted upon a head which has a pivotal connection with the bed so as to swing around a vertical axis, in consequence of which the work spindle may be arranged at an angle to the axis of the tool spindle, the tool of which is operating upon the work. In consequence of this universal adjustability of the work support in horizontal directions, the cross-feeding mechanism for the work carriage is connected to the power-transmitting devices on the bed by universal joints or connections so that the cross feed of the carriage may take place regardless of the position in which the carriage is located. The mechanism for feeding the tool slide is actuated from the main driving shaft, and the cross-feed mechanism for the work carriage is connected to or actuated by the tool-slide-controlling mechanism, though means are provided for automatically controlling the cross feed mechanism and securing a differential cross feed.

Proceeding now to the details of description of the machine, the bed may be of any suitable size and shape. It is indicated at 50 and is illustrated as being of the box type with front rear and end walls. It is shown as being provided with a vertical front to rear partition 51 which provides two compartments 52, 53 for the reception of power-transmitting mechanism. In the front of the bed there is a large opening into the compartment 53 which is normally closed by a removable door or plate 54 which, as will be explained, supports certain of the power-transmitting mechanisms. In the rear vertical wall of the bed there are also two large apertures communicating respectively with the compartments 52 and 53, which said apertures are normally closed by removable doors or plates 55 56. The latter doors are provided with manually-operated locks as indicated at 57. By the provision of these various removable doors, access is easily had to the interior of the bed and to the mechanism therein contained to clean, oil and repair it. The compartment 52 may serve with convenience as a receptacle for water which is used in the grinding operation and from which the water may be pumped by any suitable means not shown.

On the upper part of the bed are guideways or shears upon which rests a tool slide or tool carriage which is indicated as a whole at 58. Like the bed, the frame of the tool slide consists of one or more castings and it is of the shape shown in Figs. 1 to 6 inclusive. By mechanism which will be explained, this slide may be moved backward and forward on the bed to effect the length feeds of the tool. The said slide has end walls 59 60 and intermediate vertical front to rear partitions 61 62. The walls 59 and 61 serve to support the supports, sleeves or bolsters for the tool spindles. The number of these bolsters depends upon the number of tools or tool spindles which may be found to be desirable or necessary for use in the machine, and, although for general purposes I find that three are sufficient, nevertheless I may add to or detract from that number as convenience or expediency may dictate. I find that it is quite convenient to mount the bolsters in the same horizontal plane, but of course it will be understood that the invention is not limited to this particular arrangement. In the machine illustrated upon the drawings, the three bolsters are indicated respectively at 63, 64 and 65. Each bolster is held against rotation by a key 95 which is located in a notch in the wall 61, but each bolster may be moved longitudinally so as to advance the tool support thereby into potential working relation to the work. After the bolster is advanced, it is necessary that it should be locked to the carriage in order that it may move with the carriage, and I have provided a convenient means for locking all of the bolsters simultaneously as I will now explain. The walls 59 and 61 are bored out or are so formed as to provide guideways which, as shown in Fig. 30, are adapted for the reception of locking or clamping pins 66, 67 and 68, as shown in Figs. 29 and 30. Between the adjacent ends of the pins 66 and 67, which ends are beveled as shown, there is a wedge pin 69. The pins 68 and 69 converge as shown in Fig. 30, and their converging ends are beveled so that they may be engaged by the beveled ends of sliding pins 70 71 as best shown in dotted lines in Figs. 29 and 20. 72 (Fig. 30) indicates a pin in each of the walls 59 and 61 which is held in place and which is adjustable by a screw 73. The pins 66, 67, 68, 69, and 72 in the two walls 61 and 59 are duplicates and are arranged in the same way, so that, by moving the two pins 70 71 in opposite directions, their pointed ends will wedge the pins 68 and 69 longitudinally so that the pins 68 will lock or clamp the bolster 65 against movement. The pins 69, in being wedged downward, move the pins 66 and 67 in opposite directions so as to lock or clamp the bolsters 63 and 64 against movement. The pins 70 and 71, as shown in Fig. 20, are supported by the walls 59 and 61 and by a bracket which is integral with the wall 69 and the top of the tool slide frame. Between the ends of the pins 70 71 projects the pointed end of a pin 74 which is arranged transversely thereto and against the end of which abuts an adjusting screw 75. On the outer end of this adjusting screw 75, there is clamped a handle 76 by which it may be rotated so as to wedge the pin 74 inward to force the pins 70 and 71 in opposite directions with the result which I have already explained. The handle 76 is arranged on the front side of the machine, as shown in Fig. 2, so that it is accessible to the operator and may be actuated, by him without leaving his position in front of the machine. When the operator desires to unlock the bolsters so that he may advance or retract any one of them, the handle is swung so as to relieve the pressure upon the sliding pin 74 and thus release the bolsters. A movement of the handle in the opposite direction forces the screw inward so as to cause the sliding pin 74 to separate the sliding wedge pins 70 71 and lock the bolsters. While this has proved to be a very good means for locking and unlocking the bolsters, nevertheless it can be varied as may be desired and other locking means substituted therefor. It should be noted that the various sliding wedge pins fit loosely within their guideways or sockets and yet with sufficient tightness to cause them to operate satisfactorily.

In order that the various bolsters may be moved conveniently so as to place their tools with proper relation to the work or to move them out of working position, I provide suitable manually-operated power-transmitting mechanism as best illustrated in Figs. 3 and 7. Each one of the bolsters is provided with rack teeth 77 (as for instance as shown in Fig. 31) so that it may be engaged by a pinion. As illustrated in Fig. 7, I provide three shafts 78, 79 and 80 which are journaled in suitable bearings formed on the tool slide. The shaft 78 is arranged horizontally but the shafts 79 and 80 are arranged at an inclination both to the vertical and to the horizontal, although they are all preferably arranged in the same transverse vertical plane as shown in Figs. 2 and 7. On the inner end of each shaft, there is a pinion, said pinions being indicated at 81, 82 and 83, and engaging the rack teeth of the bolsters 63, 64 and 65 respectively. The pinions are preferably of sufficient diameter so that one rotation thereof will advance the bolster to its maximum position. On the said shafts are mounted handles 84, 85 and 86 by which the pinions may be rotated, and it will be noted that adjacent the handles are stops indicated at 87, 88 and 89 with which the handles will engage to limit the retractive movement of the bolsters, as clearly shown in Figs. 2 and 7. After the bolsters have been unlocked and are free to slide, any one of the handles 84, 85 or 86 may be rotated to advance its particular bolster to any desired position with reference to the work.

As in my former machine, the tool spindles are extensible or telescopic, and a description of one of them will serve for a description of the whole. These spindles are indicated as a whole at 90, 91 and 92, and upon their outer ends are mounted grinding tools having different characteristics as to dimensions shapes, abrading qualities, etc. Preferably the spindle 92 carries the cup-shaped grinding tool as indicated at 93 in dotted lines in Fig. 1. This tool is very convenient for shoulder facing and similar work. The spindle 91 carries a small disk grinding wheel 94 which may be used for internal grinding, whereas the spindle 90 carries a large disk grinding wheel 96 capable of grinding exteriors. I do not limit myself to the use of these particular tools, as they may be supplanted by special grinding wheels of different sizes, diameters and shapes which may prove desirable to use for work of different shapes, sizes etc. I preferably, however, use tools of such character that, after the work has been once clamped in the chuck as will be explained, it may be completely ground and finished without removing it from the chuck, and I have found that, for all general purposes, the three tools which I have described are sufficient for this purpose.

Taking the extensible spindle 90 as shown in Fig. 31 as an example of the others, it will be seen that it consists of two sections which telescope one into the other. The section $a$ has its inner end hollow to receive the reduced end of the section $b$, there being splines 97 which hold them in rotative engagement. The section $a$ is journaled in bearings 98 99 in the bolster 63. Suitable collars, which need not be described in detail, are utilized for holding the bearings in place and for resisting the end thrust of the section $a$ of the spindle 90. On the conical end of the section $a$ is affixed the hub 100 of the grinding wheel 96, said hub being held in place by a nut 101. The sections $b$ $b$ $b$ of the spindles 90, 91 and 92 project through bearings 102 in the wall 62 and are provided with fast and loose belt pulleys as will be explained. The ends of the spindles 90 and 92 are journaled in bearings 103 in the end wall 60, but the end of the spindle 91 is journaled in a bearing 104 in a web 105 located between the walls 60 and 62, as shown in Fig. 5, this web, as shown in dotted lines in Fig. 1, being formed on the wall 62 as shown in plan view in Fig. 1, and in end elevation in Fig. 11. On each of the three spindles 90, 91 and 92 are placed two pulleys of which one is fast and one is loose. On the spindle 90, the fast pulley is indicated at 106 and the loose pulley at 107, and it will be seen that the loose pulley is to the right and is somewhat elongated, being substantially twice the length axially of the pulley 106. In Fig. 5, it will be seen that on the spindle 92 the fast pulley is indicated at 108 and the loose pulley at 109, and that their positions are reversed in this case from what they are on the spindle 90.

The spindle 91 is provided with a fast pulley 110 and a loose pulley 111, which are located to the left of the vertical transverse planes passing through the pulleys 106, 107, 108, and 109. In a horizontal plane below the plane of the three spindles, there is a shaft 112 which is journaled in suitable bearings in the walls 60 62, and upon this shaft are arranged in alternation a fast pulley 113, a loose pulley 114, a fast pulley 115, and a loose pulley 116. These pulleys are arranged side by side and they are placed in certain relation to the spindle pulleys so that I accomplish certain results as will be explained. The two outer spindles 90 and 92 are driven by a main belt indicated at 117, whereas the pulley for the spindle 91 is driven by a belt 118 from the pulley 113 on the shaft 112. As illustrated in Fig. 11, the main driving belt 117 passes up over the pulleys on the spindle 90, thence down under the pulleys on the shaft 112, thence up over the pulleys on the shaft 92, and thence down and around a driving drum 119. The drum 119 is elongated sufficiently so that, when the tool slide is reciprocated longitudinally, the belt 117 will not be disengaged therefrom.

The said drum is mounted on the main driving shaft of the machine, which shaft is indicated at 120 and which is provided with a belt pulley 121 or other form of power-transmitting device by which it may be rotated either from a pulley or from an electric motor as may be deemed most convenient and desirable. The said main shaft 120 is journaled in a yoke 122, which, for the sake of lightness, is cast hollow. It is pivoted upon pivot studs 123 124 supported by the walls 50 51 of the bed, so that the drum may be moved to keep the belt 117 at its proper tension. At its end, the yoke is provided with a finger 125 which projects through an aperture in the front wall of the bed and which is engaged by two oppositely projecting set screws 126 126, by which it may be moved up and down and held in its adjusted position.

The spindle pulleys and the pulleys on the shaft 112 are so arranged that, when the belt is in the position shown in Fig. 5, it engages the fast pulley 108 on the spindle 92, whereby the said spindle is driven, and at the same time engages the loose pulley 116 on the shaft 112 and the loose pulley 107 on the spindle 90. Upon moving the belt 117 one step to the left in Fig. 5, the belt will now engage the loose pulley 109 on the spindle 92, the fast pulley 115 on the shaft 112, and the loose pulley 107 on the shaft 90, so that neither the spindles 90 nor 92 will be driven, but the shaft 112 will be driven positively, and through the pulley 113 and belt 118 the spindle 91 may be driven provided the belt 118 is engaged with the fast pulley 110 on said spindle 91. By moving the belt 117 one step farther to the left in Fig. 5, it will be caused to engage the fast pulley 106 on the spindle 90, the loose pulley 109 on the spindle 92, and the loose pulley 114 on the shaft 112 so that the spindle 90 will be driven positively. By this means, I am able to drive any one of the three spindles at will, the other two remaining quiescent or in a state of non-rotation.

I provide manually-operative means for shifting the two belts 117 118. The shifter for the belt 118 is illustrated in detail in Fig. 34. It consists of a small arm 127 which is apertured to permit the passage of the belt, and which is mounted upon a slide 128 supported by the walls 60 62. In an enlargement in the wall 60 there is journaled a shaft 129 having on its upper end a handle 130 by which it may be rotated, and at its lower end a crank pin 131 engaged with a groove in the slide. By rotating the shaft 129 by means of the handle 130, the slide 128 may be moved to shift the belt 118 to either the loose pulley 111 or the fast pulley 110 on the spindle 91. When it is desired that none of the tools will be rotated, the belt 117 will be shifted to the pulley 115 and the belt 118 will be shifted to the pulley 111. The shifter for the main belt 117 is shown in Figs. 2, 5, 6 and 11. It consists of a slide 132 mounted in the walls 60 62, and having a pin entering a slot in the end of an arm 133 which is secured to a shaft 134 journaled in a bracket 135. The shaft projects through the front wall of the tool slide and has upon it a handle 136. This handle carries a movable pin 137 which may be caused to engage any one of the series of apertures 138 on a segment 139 on the front wall of a tool slide so as to hold the handle 136 and a belt-shifting slide 132 in any one of three different positions to which it may be moved. The slide 132 carries two arms 140 141. These arms, as shown in Fig. 11, are arranged at an inclination both to the vertical and to the horizontal, and the arm 140 extends in close proximity to the pulleys on the spindle 90. At its end, the arm 140 is apertured to receive the belt 117. The arm 141 has an apertured projection 142 in sliding engagement with a guide bar 143 parallel to the slide 132, so as to guide it in its movements. At its lower end, the arm 141 is yoke-shaped and is provided with two guide pulleys 144 as illustrated in Figs. 5 and 11 between which the belt 117 passes. With this construction, the belt 117 is engaged both on its up-going and down-going stretches and may be easily shifted longitudinally of the axis of the belt pulleys and of the drum. The provision of the loose wheels 114 assists in shifting the belt longitudinally of the drum 119 when the tool slide is being reciprocated, for, as has been explained, the belt-shifter is mounted upon the tool slide and it is locked thereto through the medium of the locking pin 137 on the handle 136.

To sum up the foregoing description of the spindles, the spindle-controlling mechanism and the spindle-driving mechanism, it may be stated that, as described, any one of the bolsters may be advanced by its pinion into proper relation to the work, after which all of the bolsters will be locked firmly to the tool slide. Then the spindle, which is supported by said bolster and which has been selected for operation, may be rotated by shifting one or both of the belts 117 118. This is all accomplished expeditiously and easily so that there is no appreciable waste of time in selecting and placing in operation the particular tool which the operator desires to operate upon the work.

The tool slide is automatically reciprocated upon the bed and to this end it is provided with a rack 145, which, as shown in Fig. 5, projects downwardly somewhat into an open space in the top of the bed. With this rack is engaged a pinion 146 on a shaft 147 as shown in Figs. 3, 5, 6, 7 and 17. Almost any convenient form of power-transmitting mechanism may be used for transmitting power from a suitable driving shaft to the pinion 146; in fact, in lieu of the rack and pinion for reciprocating the carriage, any other mechanism may be well used for this purpose. In the machine which is illustrated upon the drawings, however, as embodying the invention, I transmit power from the main driving shaft 120 for this purpose. I shall not attempt to describe in detail this power-transmitting mechanism except in so far as it may differ from that illustrated in my said Patent No. 925,867, to which reference has hereinbefore been made. In essence it is substantially the same but I have made a few changes which I will note. By an examination of Fig. 7, it will be observed that the main driving shaft 120 carries a pinion 148 intermeshing with and driving a gear wheel 149. The gear 149 is on a shaft 150 which extends into a gear case 151 located in the bed of the machine in front of the door 55. Through the gearing in the said case which is not shown, power is transmitted at any one of a variety of speeds, nine for instance, to the shaft 152. The two controller levers for shifting the clutches in the power-transmitting mechanism, in consequence of which the shaft 152 is driven at any one of a number of speeds, are indicated at 153 154, the former being secured upon a rock-shaft 155 and the latter upon a sleeve 156. The sleeve 156 carries the clutch-shifting yoke 157, whereas the rock-shaft 155 carries the clutch-shifting yoke 158. The shaft 155 passes through the sleeve so that the two controller levers 153 and 154 are in front of the bed and one behind the other where they can be more easily actuated by the operator than was possible in my previously patented construction. Pivoted to the axis of the shaft 152 is the yoke or frame 159, in which is journaled a shaft 160 carrying friction disks 161. The shaft 160 is rotated by a train of gears 162 163 and 164 from the shaft 152. As in my patented machine, the yoke 159 carries an adjustable screw 165 resting upon an eccentric 166 on a shaft 167 projecting through the front wall of the bed, said shaft being equipped with a wheel 367 having handles 168 by which it may be rotated so as to cause the eccentric 166 to raise and lower the yoke. The friction disks 161 are engaged with a complemental friction disk 169 (see Figs. 6, 7 and 17) fast upon a shaft 170. As a matter of convenience in construction, the shaft 170, which is arranged longitudinally of the bed, is mounted in a frame 171 which is cast upon the removable plate 54 which I have previously described. This frame is well shown in Figs. 7 and 17. In it is journaled the shaft 147, which, as previously stated, carries the pinion 146 engaging the rack on the slide. This last-mentioned shaft 147 is arranged at right angles to the shaft 170, and it is provided with a worm wheel 172 which is engaged with and driven by a worm 173 on the end of the shaft 170, as shown in Fig. 7. The worm 173 is fast upon the shaft 170, but the friction wheel 169 is loose thereon, this being for the purpose of transmitting power to said shaft so as to rotate it alternately in opposite directions. Secured to the hub of the friction disk 169 is a bevel gear 174, there being also an oppositely arranged bevel gear 175 loose on the shaft as shown in Fig. 17. These two gears intermesh with a bevel gear 176 mounted loosely upon a shaft 177 journaled in the frame 171. The two bevel gears 174 175 are provided with clutch teeth and playing between them is a clutch 178 splined upon the shaft, so that, by causing the clutch to be engaged with either of the bevel gears, the shaft 170 will be rotated in one direction or the other as will be well understood. The clutch may be shifted by hand as will be explained, but is also shifted automatically when the tool slide reaches either extreme of its required movement as will be explained, the distance to which the tool slide moves before the clutch is operated being controlled by adjustable stops on the carriage.

The clutch-shifting mechanism is shown in Figs. 2, 7, 13 to 15 inclusive, and 17 to 22 inclusive, to which reference may be had. On the front of the tool slide I provide a plurality of stops. These take the form, in the embodied invention, of a series of headed screw pins, the heads of which are arranged in undercut longitudinal grooves 179. These grooves are formed in parallelism, as shown in Fig. 2, one above the other in the front wall of the tool slide. In each groove are arranged two stops as indicated at 180, 181 and 182. If there were more tools and spindles in the tool slide, naturally more grooves and stops would be provided. To coact with these stops, I provide a finger or projection 183 formed on a sleeve 184 keyed to move upon an upright shaft 185 which is journaled in a bearing 186 formed on the outer face of the plate 54, which, as previously explained, is secured to the bed. This construction is shown in Figs. 2, 7 and 22. The sleeve 184 may be adjusted in any one of three positions so that its finger or projection will be in alinement with the stops 180, 181 or 182 as the case may be. On the drawings, the finger 183 is illustrated as in alinement with the stops 182. Consequently as the tool slide moves forward and back, the finger or projection 183 on the sleeve 184 will be engaged and moved first in one direction and then in the other direction so as to rock the shaft 185. In order to hold the sleeve 184 at any one of its several positions, there is embedded in the shaft 185 a spring-pressed pin 187 whose outer rounded end is adapted to enter slightly into any one of a series of sockets 188 in the sleeve as shown in Fig. 21. On the lower end of the shaft 185 there is an arm or lever 189 which is of the shape shown in detail in Fig. 19, and when the shaft is rocked, this arm serves to operate a clutch lever and move the clutch 178 in one direction or the other with spring-pressure but with a snap. It will be observed that this lever 189 carries two oppositely-projecting alined spring-pressed pins 190 191 whose ends bear against a pin or projection 192 on a second lever 193, the latter being shown in detail in Fig. 18. This last-mentioned lever 193 is pivoted between its ends on a stud 194 which projects upwardly from the manually-operated clutch lever 195 as shown in Fig. 22. I will explain how this clutch lever 195 is operated later on, but, for the purpose of making it clear how the rockshaft 185 shifts the clutch, this last-mentioned clutch-shifting lever 195 may be regarded as stationary or in a neutral position in which it is held by a spring-pressed pin 196 mounted in the lower end of the shaft 185 and engaging one of a series of notches in the lever, as shown in Fig. 21.

Returning to the lever 193, it will be observed that it is formed with a semi-circular yoke 197 in the ends of which are rollers 198 entering the peripheral groove in the clutch 178. As thus far explained, it will be apparent that, when the shaft 185 is rocked and the lever 189 is swung to the left in Fig. 17, the spring-pressed pin 190, bearing upon the pin or projection 192 of the lever 193, will swing the outer end of the last-mentioned lever to the left so as to throw the yoke 197 to the right and shift the clutch 178 from engagement with the bevel gear 174 into engagement with the bevel gear 175 so as to reverse the rotation of the shaft 170 through the mechanism previously explained. It is highly desirable, however, that the clutch should be shifted with a quick movement or snap by power accumulated in one or the other of the springs 199 which bear upon the pins 190 191. Therefore I provide the two levers 189 and 193 which overlap each other as clearly shown in Fig. 17, with coacting stops which hold the lever 193 against movement until the lever 189 has moved through an arc of predetermined length, and has stored sufficient power in one of the springs 199 to effect a rapid and powerful shifting of the clutch. These coacting stops are illustrated in Figs. 13, 14, 15, 17, 18 and 19. I desire to call attention to the fact that the axes of oscillation of the two levers are vertical and parallel, so that, when the two levers swing about their axes, their relative movement is similar to the movement of two disks mounted on parallel shafts and overlapping. The two stops take the form of pins or studs 200 201 which are driven into suitable annular bosses in the two levers. The pin 200 has a downwardly projecting straight rib 202, whereas the stop pin 201 has a similar upwardly projecting rib 203. These stop pins or abutments, as they might be termed, are so mounted in their respective levers 189 and 193 that the elongated faces of the ribs 202, 203 are adapted to engage as shown in Figs. 14, 15 and 17. Assuming that the parts are in the position in Fig. 17 and Fig. 14, or in dotted lines in Fig. 13, it will be seen that, if the lever 189 be moved toward the left, the rib 202 will move under the rib 203 so that the lever 193 will be incapable of swinging about its pivot 194. This condition of things will continue while the lever 189 continues to move to the left, storing up pressure in the spring 199 bearing against the pin 190, until the rib 202 rides out from under the rib 203, whereupon the lever 193 will be released and the said spring 199 through the pin 190 and the projection or stud 192 on the lever 193 will move said lever with considerable power about its pivot 194 so that its yoke 197 will shift the clutch. Then the parts will immediately assume the position shown in Fig. 15 or in full lines in Fig. 13. If, now, the lever 189 be moved to the right, the rib 202 will move back of the rib 203 and the lever 193 will be held against movement until the rib 202 has passed beyond said rib 203 and has permitted power to be accumulated in the spring 199 bearing against the pin 191, so that the pin by its engagement with the stud or projection 192 can throw the lever 193 about its pivot stud 194 with a quick snap to shift the clutch from the full line position in Fig. 13 to the dotted lines in that figure. This action of the stops is caused because the stops are located considerably to one side of a line connecting the axes of the pivot stud 194 and the shaft 185 on which the two levers 193 and 189 are mounted. Thus from this description, it will be apparent that, as the tool slide moves forward, its advance will be stopped by the shifting of the clutch in the slide-actuating mechanism, and the slide will be retracted until its stop engages the finger on the sleeve 184, whereupon its retrograde movement will cease and the clutch shifted to cause the slide to be advanced again.

In order that the clutch may be shifted manually so that the movement of the tool slide may be under manual as well as automatic control, I provide the hand lever 195 to which I have previously referred. This hand lever is bent upwardly at its forward end in front of the bed, and it projects through an aperture in the front wall of the bed rearwardly as shown in Fig. 22. The rear end of the hand lever 195 is yoke-shaped and it is pivoted by a pin 204 on a bracket 205 on the frame 171 previously referred to. The pin 204 is directly beneath the shaft 170. As stated before, the hand lever 195 carries the stud 194 on which the lever 193 is pivoted. This hand lever ordinarily occupies the position shown in Figs. 17, 21 and 22. Should it be desired to shift the clutch 178 by hand from the position shown in Fig. 17 to the position shown in full lines in Fig. 13, the lever 195 will be moved to the right about its pivot 204. As it moves to the right, the stud 194, which it carries and on which the lever 193 is journaled, will likewise be moved in the same direction. The lever 193, however, is loose upon the pivot 194 so that it would remain in the same place where it is shown in Fig. 17 were it not for the fact that its stud or projection 192 on its outer free end engages the pin 190, so that it stores power in the spring 199 until the power is sufficient on further movement of the arm 195 and the stud 194 to shift the lever 193 to the right to throw the clutch 178 into engagement with the bevel gear 175. This does not take place however until after the rib 203 of the stop 201 rides over the rib 202 of the stop 200.

Thus, from the foregoing description, it will be seen that, while the tool slide is automatically advanced and retracted, yet at the same time its longitudinal feed in either direction may be stopped or reversed by the manually operated lever 195. In addition thereto, by rotating the eccentric 166 by means of the handle wheel 367, the yoke 159 which carries the friction disks 161 may be dropped out of engagement with the friction disk 169 so as to disconnect the main shaft from the slide-feeding mechanism.

I will now proceed to describe the mechanism for holding and rotating the work and for positioning the work as may be desired with reference to the particular tool that has been selected for operation upon the work. As indicated previously in this specification, the cross feed is secured by moving the work itself instead of moving the tools laterally, and in order to secure a speed of rotation of the work properly proportioned to the speed of rotation of the tool, the work is driven from the same shaft 152, which has previously been described, from which the slide-moving mechanism is actuated. The cross feed of the work is controlled and actuated by the tool slide so that each time the movement of the slide is reversed, the work is cross fed one step, this occurring at the end of the forward feed of the tool slide and at the end of the rearward feed thereof. As in my previously patented machine, the work is held in a rotatable chuck or holder which is supported in a laterally movable carriage. The latter in turn is mounted upon a longitudinally movable slide, and the slide is mounted on a table which is capable of oscillation about a substantially vertical axis. The table is indicated as a whole at 206. It consists of a hollow casting which is pivoted upon an upright cylindrical bar 207 which is passed through brackets 208 209 at the left end of the bed as best shown in Fig. 5. This bar 207 intersects the axis of the shaft 152. Mounted loosely on the bar 207 is a bevel gear 210 which intermeshes with and is driven by a bevel gear 211 on the shaft 152. Journaled in the table is a shaft 212 from which is driven a drum 213, as will be explained. The shaft 212 is provided with a bevel gear 214 of the same size and number of teeth as the bevel gear 211 and intermeshing with the bevel gear 210. From the drum 213 power is imparted to the work spindle as will be subsequently explained. Since the work table is movable about the axis of the shaft or bar 207, it is necessary that means be provided for rigidly clamping it in any position to which it may be oscillated. To this end, the bed, as shown in Fig. 2, is provided with a bracket 215 projecting endwise and forwardly. The upper surface of the bracket is substantially flat and over it projects a web 216 cast with or secured to the table. This web is substantially segmental in shape, as shown in Figs. 23 and 24, its outer edge being concentric with the axis of the shaft or bar 207. Its front edge is provided with a scale 217, as best shown in Fig. 2. This web is clamped by clamping mechanism so as to lock the table against oscillatory movement. Any suitable clamping mechanism for this purpose may be utilized. I have shown a convenient mechanism which consists of a shaft 218 journaled in a bearing 219 in the bed bracket 215. To the lower end of the shaft 218 is clamped a handle 220. The upper end of the shaft 218 is threaded and projects above the bearing, and upon the threaded end is a nut 221. The upper projecting end of the bearing is grooved to receive the edge of the rib 216 and the nut projects over the rib so that, when the screw shaft 218 is rotated, the nut will be drawn tightly against the rib so as to clamp it to the bracket 215 and thus lock the table and the bed firmly together. The advantage of this particular construction is that the locking mechanism is located some distance from the axis of the bar 207, and consequently I get a greater rigidity of construction than in my previous machine. As shown in Fig. 8, the table 206 is provided at its top with ways or shears 222 on which is properly gibbed a slide 223. This slide is extended endwise sufficiently so that it projects at one end wall beyond the end of the table, and at its other end it projects well into the bed below the tool slide so as to cover and protect the parts that are there-beneath from particles of metal or of the abrading material which is used in making the grinding wheels.

Formed on or secured to the under side of the slide is a rack 224 with which engages a pinion 225 on a shaft 226 journaled in the table and projecting through a bearing in the front wall thereof as shown in Figs. 1 and 2. On the forward end of this shaft is a hub 227 having radial handles 228 by which the shaft may be rotated so as to move the work slide longitudinally. On the upper surface of the slide 223 are transverse guideways to which the work carriage 428 is gibbed to slide forward and back or transversely of the bed and of the tool spindle. This carriage may be formed in any suitable way but preferably it is hollow so as to contain a portion of the power-transmitting mechanism by which the chuck spindle is rotated. The chuck spindle, which is indicated at 229, is mounted in suitable bearings in the carriage and is held by any convenient means against end thrust. The chuck spindle carries on its right end a chuck 230 of any desirable construction by which the work may be clamped, held and rotated. Any suitable or convenient means may be utilized for imparting power to the chuck spindle but I utilize substantially the same mechanism which I have illustrated in my patent hereinbefore referred to. This may be briefly described as follows: Journaled on the shaft 212 is a casing 231 in which is journaled a drum shaft 232. The shaft 232 and the shaft 212 are provided with intermeshing gears 233, 233 respectively. Passing around the drum 213 and around a pulley 234 on the chuck spindle, is a belt 235 which is guided by drums 236, 237 mounted on loosely rotatable shafts 238, 239 as shown in Figs. 5 and 8. In order that the belt may be kept taut at all times, the casing 231 has an ear or lug 240 to which is pivoted a bar 241 passing downward through the table and encircled by a spring 242, the lower end of which rests against nuts 243 on the said bar, the upper end of the spring bearing against the table so that the casing is drawn downward yieldingly. As the work carriage is moved longitudinally, the belt 235 slides along the drums, and, when the said carriage is moved transversely, the casing 231 and the shaft 232 swing about the axis of the shaft 212 against the resistance of the spring 242 so that the belt 235 is always kept taut. The belt pulley 234 is mounted loosely on the chuck spindle as described, but it may be clutched thereto by a clutch 244 which is splined upon the spindle. The clutch is shifted in one direction or the other by any convenient means, as for instance, a slide 245 (see Fig. 1) to which is attached a handle 246. This slide carries a yoke, a portion of which is shown in section in Fig. 5, and which is indicated at 247. In order that the rotation of the chuck spindle may be reversed, I employ suitable mechanism for driving it in the opposite direction, which may be clutched to the spindle by the clutch 244. This reverse mechanism comprises a shaft 248 which is rotated by gears 249 and 250 (see Fig. 5). The shaft 248 also carries a gear 251, which, through an intermediate gear not shown, drives a gear 252 loose on the chuck spindle. The gear 249 is fast with the pulley 234, and the two gears 249 and 252 have gear teeth with which the clutch 244 may be alternately engaged. As shown in Fig. 5, the clutch is in a neutral or intermediate position at which time no power would be transmitted to the chuck spindle.

I will now explain how the work carriage is cross fed either by hand or by power, reference being had more particularly to Figs. 1, 2, 3, 4, 17 and 21 to 28 inclusive. Secured to the under side of the base of the carriage 428 is a nut 253 located between suitable lugs 254 and by a screw 255 (see Fig. 27). With the nut is engaged a threaded feed shaft 256 arranged transversely of the slide 223 and journaled at its forward or outer end in a bearing 257 formed on a bracket 258 projecting forwardly from the work slide 223, as shown in Figs. 24, 25 and 26. The forwardly projecting end of the shaft 256 is equipped with a handle 259 by which it may be rotated manually to feed the work carriage laterally with reference to the slide on which it is mounted, and consequently laterally of the tool spindles so as to bring the work in the chuck into proper position with reference to the particular tool which is to operate upon the work.

For cross feeding the work carriage automatically in one direction or the other, I employ the following mechanism. Fast upon the forward end of the shaft 256 is a gear wheel 260, as shown in Figs. 25 and 26. This gear wheel, and the gears to be subsequently explained, are in a casing 261 which is bolted or otherwise secured to the bracket 258 in any suitable manner. Journaled in bearings in the casing 261 is a shaft 262 on which is secured a ratchet wheel 263. By means which will be described, the ratchet wheel is rotated with a step by step movement. Journaled loosely on the shaft 262 within the casing 261, there is a block or carrier 264 having a handle 265 which projects through an aperture in the end of the casing so that the block or carrier may be oscillated. The block is hollow or recessed to receive two pinions 266 267 mounted on suitable shafts journaled in the said carrier, either of which gears may, by rocking the carrier, be brought into intermeshed engagement with the gear 260. The gear 266 intermeshes directly with a gear or pinion 268 formed on or secured to the shaft 262, whereas the gear 267 intermeshes with an idler gear 269 intermeshing with and driven by the pinion 268, in consequence of which the gear 267 rotates in a direction opposite to the rotation of the gear 266 as indicated by arrows in Fig. 26. When the ratchet wheel 263 is being rotated in the direction of the arrow thereon in Fig. 26, the gear 260 and the cross-feeding shaft 256 will be rotated in one direction or the other according to which of the two gears 266 and 267 is intermeshed therewith. As shown in Fig. 26, the carrier 264 is in a neutral position so that the rotation of the shaft 262 will have no effect upon the cross feed shaft 256 and the said feed shaft may be operated manually without affecting said gears. In order to hold the carrier in any one of the three positions into which it may be moved, it is provided with three notches or sockets 270, and the casing 261 has a guideway 271 to receive a spring-pressed pin 272 for engaging any one of said notches. In order to indicate the position of the carrier 264, the handle 265 has a pointer or index 273 movable over a scale 274 on the front face of the casing as shown in Fig. 24.

The ratchet wheel 263 is oscillated automatically whenever the actuating mechanism for the clutch 178 is operated, this occurring as has been explained when the main tool slide reaches either extreme of its movement. To this end, there is journaled in bearings 275 276 in the table 206 a rocking actuator 277 (see Figs. 2, 23, 24 and 25). This actuator, being journaled upon the table, swings about its axis of oscillation whenever the table is adjusted, and it is connected by universal joints as will be explained with a telescopic or extensible shaft indicated as a whole at 278 (see Figs. 17 and 24). This said shaft consists of the telescoping sections in which the section $e$ projects into the sleeve $d$. The sleeve $d$, at its left end, is connected by a universal joint or coupling $f$ with the end of the rocking actuator 277, as shown in Figs. 23 and 24, by a pin or other suitable fastening. The member $e$ of the extensible shaft 278 is connected by the universal joint or coupling $g$ with the section $h$ of said shaft which is journaled in a bracket 279 projecting inwardly from the plate 54, as shown in Fig. 17, immediately above the clutch-actuating lever 189. The section $h$ of said shaft is provided with a head 280 having a radially projecting pin 281 which extends downwardly into the path of the wedge cam 282 on the clutch-operating lever 189, as best shown in Fig. 19. It will be seen from this description that, each time the lever 189 is rocked by the shaft 185, the cam 282 will cause an oscillation of the shaft 278. The cam is shown in Fig. 19 as having two operating faces $i$ and $j$ at an obtuse angle to each other. As shown in Fig. 16, however, the cam is illustrated at 283 and the faces $k$ and $m$ of the cam form a reëntrant angle instead of the angle shown in Fig. 19. In Fig. 16, the different positions of the end of the pin 281 with reference to the cam faces are shown in dotted lines. The rocking actuator 277 operates a lever 284 (see Fig. 24) which carries at its upper end a pawl 285 having a hardened steel tooth 286 engaging the ratchet wheel 260. The lever 284 is of a peculiar shape, as shown in Figs. 24 and 25. Its lower end projects rearwardly and has two upwardly-extending arms 287 and 288. Through the lever 284 and its arm 287 are passed pivot pins 289 formed on or secured to the casing 261, and which provide the axis of oscillation for the said lever. The arm 288, as shown in Fig. 24, projects forwardly at an angle to the lever and it carries a pin 290 which projects into engagement with and above an elongated rib 291 on the actuator 277. With this construction, each time the rib 291 on the actuator is raised by the oscillation of the actuator through the mechanism previously described, the lever 284 will be rocked about its pivots 289 in the direction of the arrow in Fig. 24 so that ordinarily the pawl will rotate the ratchet wheel one step. The movement of the lever 284 in the opposite direction is effected by a spring 292 (see Fig. 23), one end of which is connected to a stud or projection 293 on the casing, and the other end to a pin 294 projecting upwardly from the arm 287 of the lever (see Figs. 24 and 25). The tension of this spring returns the lever 284 and the pawl 285 to their initial positions, and, by reason of the engagement of the pin 290 with the rib 291 of the actuator 277, maintains the bearing of the end of the pin 281 on the head 280 with the cam 282 on the clutch-operating lever 189.

It is highly desirable that the cross feed of the work should be differential or varied so that the work will at first be fed with a relatively coarse feed, and then with a fine feed as the abrasion of the work is performed by the particular tool which is operating thereon. This cross feed of course takes place only when the tool has reached either extreme of its movement as has been explained. This differential feed is secured by varying the length of movement of the feed lever 284 and its pawl 285. Any convenient means may be employed for accomplishing this result, but I find that I now employ with advantage the particular mechanism which I shall now describe.

Referring to Figs. 23 and 24, it will be observed that the lever 284 is provided with a bracket 295 which carries a series of stops, which, in the present embodiment of the invention, consist of pins 296, 297 and 298 capable of being moved into and out of active position. In Fig. 24 the stop pin 296 is in active position, whereas the stop pin 297 is withdrawn to an inactive position. Any convenient means for holding these pins in the positions to which they are moved may be employed. These pins extend substantially parallel with the longitudinal or median line of the lever 284. On the bearing 257, which, as previously stated, is formed on or secured to the casing 261, are placed a plurality of stop pins equal in number to the stop pins 296, 297 and 298 carried by the lever 284. The said stop pins on the bearing are indicated respectively at 299, 300 and 301, and they are arranged to register with the three stop pins 296, 297 and 298. There is one pin in each of the two series for each of the tools on the tool slide, so that, when one tool has been selected for operation, say the grinding wheel 96, the stop pin 296 will be depressed as shown in Fig. 24 so as to coöperate with the pin 299. The position of the pin 299 in this instance will limit the spring-impelled movement of the cross-feeding lever 284 so that in the next movement of the lever in the direction of the arrow in Fig. 24, the ratchet wheel will be moved a distance equal to one, two or more teeth, depending of course upon the position of the pin 299. The pins 299, 300 and 301 are moved automatically to limit the extent of each step of the cross feed by cams which may be selected for operation. These cams are indicated at 302, 303 and 304 respectively, and they are placed upon the shaft 262 hereinbefore described. The hub of each cam is provided with suitable clamping means by which it may be rotatively adjusted about the shaft 262 and then secured in position thereon. These said cams are alined respectively with the slidable stop pins 299, 300 and 301, and each is so formed on its outer edge (as shown in Fig. 23) that it will engage its alined stop pin and move it gradually to the right in Fig. 24. The shape of the edges of the cams will be varied as circumstances may require, and they may be replaced by others which are interchangeable therewith. During the first reciprocation of the main tool slide with its grinding wheel which has been selected for operation, the proper stop pin on the lever 284 having been placed in active position, the ratchet wheel 263 will be oscillated through an arc of movement of maximum length; and, as the grinding continues, the movement of the tool slide effects the rotation of the shaft 262 so that the cam on the shaft 262 will move the sliding stop pin on the bearing 257, and hence the oscillations of the arm 284 will be gradually lessened in consequence of which the arc of oscillation of the ratchet wheel will likewise be gradually lessened, and the length of the feeding movement of the work carriage, at the end of each forward and rearward movement of the tool slide, gradually decreased until the cross feed finally ceases.

From this description it will be apparent that not only is the work cross fed automatically step by step with reference to the grinding tool, but that the length of each step by step movement of the work carriage is automatically decreased so as to vary the amount of metal on the work removed by the grinding tool. Thus the grinding tool, during its first length feed, will remove a maximum amount of material from the work, whereas during subsequent length feeds the grinding tool will remove less and less material from the work and finally leave a highly finished surface thereon.

I have explained the mechanism by which the work slide may be fed longitudinally of the axis of the work spindle so as to position the work with respect to the tools. I desire now to point out that I provide stops for limiting the extent of longitudinal movement of the work slide, so that the work may be placed accurately in different positions for the three tools which are to operate upon it.

By reference to Figs. 4, 8, 9 and 10, it will be seen that, at the left-hand end of the work table 206 and in the end wall thereof, are three adjustable stops or abutments which consist of horizontally arranged bars 305, 306 and 307, of which one is shown in Figs. 9 and 10 at 307. Each of these bars is longitudinally adjustable and may be clamped in position by any suitable means, such for instance as wedging pins 309 310 and a set screw 311 bearing against the wedge pin 310. For the purpose of coöperating with these stops or abutments, the slide 223 is provided at its left-hand end with a series of stop pins 312, 313, 314, as best shown in Fig. 4. These stop pins may all be raised out of registration with the abutments or stops, but they may be separately dropped into alinement with their respective abutments. As shown in Fig. 9, each stop pin is provided with a pin 315 which may descend into a slot 316 communicating with the socket in which the pin is placed. By raising the pin out of the socket and rotating the stop, the stop pin will be held in its elevated or inactive position. It will be understood that the number of abutments and the number of stop pins just described, as well as the number of coacting stops for controlling the transverse feed of the work carriage, will preferably, although not necessarily, depend upon the number of tool spindles or tools which are carried by the tool slide.

I have not attempted to describe in detail the construction and configuration of the bed, the tool slide, the work table, the work slide, or the work carriage, as these various parts are all cast or formed to support, accommodate or inclose the various operative parts of the machine. I do desire, however, to call attention to several features of convenience which some of these parts possess. For instance, it will be seen from Fig. 8 that the work carriage is provided at its base at the front and rear with extensions which are indicated at 317 317 so as to insure that in its various positions it fully projects over and covers the hollow work table which is therebeneath. The tool slide, as shown in Fig. 5, is provided at its left end and at its base with an extension or pan 318 which projects well under the chuck 230, so as to receive the water and whatever particles are removed from the work or the grinding tools by the grinding operation, and also so as to protect the parts which are located beneath it. This pan 318 is formed with a lip 319 at its end and its front and rear sides are curved upwardly, as shown in Fig. 4. The operator is protected from flying particles by a hood 320, which, as shown in Fig. 5, is supported by a bar 321 supported in the walls of the work slide casing or frame. This hood has its front and rear walls resting upon the up-turned front and rear walls of the pan 318, and it may be adjusted so as to inclose the work and the tool which is operating upon it. The top of the bed, as shown in Figs. 5 and 7, is formed with a longitudinal inclined trough 322 to receive the water which accumulates in the pan 318, there being an opening in the pan (not shown) which discharges the water into the trough. From this trough, a pipe 323 leads into the compartment 52 in the bed. If desired, a strainer may be used at the head of the pipe 323 for preventing the accumulation of chips in the compartment in the bed. Any convenient means may be employed for pumping the water from the compartment and delivering a jet upon the work and the tool which is operating thereon. The tool slide and the work carriage are provided with detachable covers indicated at 324, 325, 326 and 327, which may be removed to permit access to the mechanism within these said parts.

I have already stated that, in lieu of the particular grinding tools which I have illustrated and described, I may substitute other grinding tools or attachments for accomplishing special purposes. As illustrating one form of attachment which may be utilized in lieu of one of the tools shown, I refer to Figs. 35 to 43 inclusive. These figures illustrate an attachment for making it possible to grind internal concave surfaces of varying curvatures; for example, ball bearing races and the like. The attachment is illustrated as mounted upon the bolster 64, the grinding wheel 95 having been removed for this purpose. The bolster is advanced and locked in position, and upon it is hung a yoke 328. This yoke is held against axial movement by a collar 329 arranged between the arms 330 and 331 of the yoke. The collar 329 is rigidly clamped upon the bolster 64 so that it is held against rotation. The said collar 329 is formed with an arm or bracket 332, into which is passed a headed screw 333. In alinement with this screw, there is a spring-pressed pin 334 as best shown in Fig. 38. The arm 330 of the yoke is formed at its end to receive and clamp a support 335 which is apertured to receive the bearing sleeves for a tool spindle 336. The arm 330 is also provided with a pin 337 which projects between the ends of the opposing screw 333 and spring-pressed screw 334, so that, by rotating the said screw 333, the yoke 328 may be adjusted relatively about the bolster. Preferably the arm 330 extends horizontally from the bolster 64, as shown in plan view in Fig. 35, so that its rotative adjustment causes it to be moved in an arc substantially vertically. On the tool spindle 336 is secured a small pulley 338 connected by a belt 339 with a pulley 340 secured to the end of the spindle 91, so that, when the spindle 91 is rotated, the spindle 336 will be likewise rotated. On the end of the said spindle 336 is secured by any suitable means a grinding wheel as at 341. The end of the spindle, on which the grinding wheel 341 is mounted, is supported and braced by the tubular extension 342 on the support 335. The grinding wheel, when used for forming concave surfaces or grooves, will have a convexly beveled edge. In Fig. 41, I have shown how a grinding tool of this character may be utilized to form curved surfaces of varying degrees of curvature, this figure representing the parts in plan view. In this case, the work, which is indicated at $n$, is one member of a ball bearing in which it is desired to form the curved race. By means of the oscillatory work table with which the machine is provided, the work may be moved to and located in the position shown in full lines in said figure. In this case, the axis of rotation of the tool shown at $x$ $x$ is at an angle to the axis of the work which is indicated at $y$ $y$. When the parts are in the positions shown, the tool will form a concave surface of a given curvature. When the work is shifted to the dotted line position, so that its axis is as indicated at z z, the curvature of the concave surface will be decreased and the curved groove widened as clearly shown. The groove made by the tool when the work is in the full line position is indicated at v, whereas the width of the groove made by the tool when the work is in the dotted line position is indicated at w.

In Figs. 42 and 43, I have shown in full lines the relative positions of the work and the tool which are shown in Fig. 1. When the tool is operating upon the work in either of these positions, the yoke may be adjusted so as to cause the tool to be fed into the work by rotating the screw 333, this having the effect of adjusting the tool substantially vertically. In this case therefore, I secure a practically universal relative adjustment of the tool and the work, for the work is adjustable horizontally in every direction, whereas the tool is adjustable vertically as well as longitudinally. When this attachment is in operation, the tool slide will be of course in a state of rest and will not be reciprocated. It is quite evident that various other tools and adjustments may be employed which will suggest themselves to one skilled in the art.

Since I have explained the operation of the various instrumentalities in describing the construction thereof, it will be unnecessary to repeat the same and describe the operation of the machine as a whole. It likewise seems unnecessary to point out the advantages which the invention possesses, as they will be apparent to persons familiar with the art. I do desire, however, to refer to one feature of the machine, as hereinbefore described, which has not as yet been directly referred to, to wit: that, by the provision of the independently movable tool supports or bolsters, which are held against lateral or cross-wise movement relatively to the tool slide or carriage, the tools may be projected in any desired sequence to operate upon the work. Where the tool supports or bolsters are mounted in a turret, the tools are brought successively or in an unvarying sequence into position where they may be projected. In the present case, however, they are always in position to be projected and no time is lost, as is the case where the turret must be first rotated before the tool is brought into such position. For some kinds of work to be performed automatically, the turret is employed advantageously, but it is undesirable in many cases and for the latter the present arrangement is preferable.

As stated in the beginning of this specification, it is extremely difficult to show on the small accompanying drawings the exact relative sizes and shapes of the various elements of which the machine consists, so that in many cases, they are illustrated somewhat conventionally, although I have endeavored to illustrate the invention in such detail and to describe it with exactness, so that it may be reproduced by persons skilled in the art to which this specification is addressed.

Having thus explained the nature of my said invention and described a way of constructing and using the same, although without attempting to set forth all of the forms in which it may be made or all of the modes of its use, what I claim is:—

1. A grinding machine, comprising a bed, a reciprocatory tool slide thereon, a plurality of rotary grinding tools and spindles therefor mounted on said tool slide in fixed lateral relation to said slide, a work holder, mechanism for effecting a relative length feed of the tool slide and the work holder, and automatic mechanism for effecting a relative rectilinear cross feed of said tool slide and said work holder.

2. A grinding machine, comprising a bed, a reciprocatory tool slide thereon, a plurality of rotary grinding tools and spindles therefor mounted on said tool slide in fixed lateral relation to said slide, a work holder, mechanism for effecting a relative length feed of the tool slide and the work holder, automatic mechanism for effecting a relative cross feed of said tool slide and said work holder, and mechanism for automatically varying the speed of said cross feed.

3. A grinding machine, comprising a bed, a reciprocatory tool slide thereon, a plurality of rotary grinding tools and spindles therefor mounted on said tool slide in fixed lateral relation to said slide, a work holder, mechanism for effecting a relative length feed of the tool slide and the work holder, automatic mechanism for effecting a relative step-by-step cross feed of said tool slide and said work holder, and means for varying the length of such steps.

4. A grinding machine comprising a bed, a reciprocatory tool slide thereon, a plurality of rotary grinding tools mounted on said tool slide with their axes in substantially the same horizontal plane, a work holder movable transversely of the bed to position the work with respect to a selected tool, instrumentalities for rotating said work holder and said tools, mechanism for automatically reciprocating said tool slide longitudinally of the bed, and mechanism for automatically cross-feeding said work holder from its adjusted position.

5. A grinding machine comprising a bed, a reciprocatory tool slide thereon, a plurality of rotary grinding tools mounted on said tool slide with their axes in substantially the same horizontal plane, a work holder movable transversely of the bed to position the work with respect to a selected tool, instrumentalities for rotating said work holder and said tools, mechanism for automatically reciprocating said tool slide longitudinally of the bed, and mechanism for automatically cross-feeding said work holder from its adjusted position, said mechanism including automatic means for varying the speed of such cross feed whereby the depth of cut of the grinding tool in the work is varied.

6. A grinding machine, comprising a bed, a work holder, a tool slide mounted to slide longitudinally thereon, a plurality of tool spindles mounted on said slide in substantially the same plane and in laterally fixed relation to said slide, means for rotating said spindles, and means by which each spindle may be advanced to bring the tool thereon into operative relation with the work.

7. A grinding machine, comprising a bed, a tool slide mounted to slide thereon, a plurality of rotatable grinding wheels supported on said slide, and power-transmitting mechanism mounted on said tool slide for selectively projecting each of said grinding wheels in the direction of its axis independently of the others to bring it into operative relation to the work.

8. A grinding machine, comprising a bed, a tool holder, a plurality of rotary grinding tools thereon, mechanism for rotating said tools, power-transmitting mechanism mounted on said slide for selectively projecting said tools axially independently of each other, a work holder, mechanism for feeding said tool holder and said work holder, one with relation to the other, in lines parallel with the axis of rotation of said tools, and mechanism for feeding said work holder and said tool holder one with relation to the other in lines transverse to the said axes of rotation of said tools.

9. In a grinding machine, a bed, a tool holder, a work holder, automatic mechanisms for effecting a length feed and a cross feed of said work holder and said tool holder, one with relation to the other, a plurality of rotary tool spindles having tools thereon, longitudinally movable supports for said tool spindles mounted on said slide, and mechanism for selectively moving said supports.

10. In a grinding machine, a bed, a plurality of rotary grinding tools, rotary spindles for said grinding tools, independent longitudinally movable supports for said grinding tools by which each tool may be projected axially into desired relation to the work, and selective power-transmitting mechanism for moving any one of said supports longitudinally independently of each other.

11. In a grinding machine, a bed, a plurality of rotary grinding tools, rotary spindles for said grinding tools, independent longitudinally movable supports for said grinding tools by which each tool may be projected axially into desired relation to the work, and means for simultaneously locking or unlocking said supports.

12. In a grinding machine, a bed, a plurality of rotary grinding tools, rotary spindles for said grinding tools, independent longitudinally movable supports for said grinding tools by which each tool may be projected axially into desired relation to the work, a power-transmitting device in operative relation to each support to move it, and instrumentalities for actuating such devices.

13. In a grinding machine, a bed, a plurality of rotary grinding tools, rotary spindles for said grinding tools, independent longitudinally movable supports for said grinding tools by which each tool may be projected axially into desired relation to the work, a rack formed on or connected to each of said supports, a gear intermeshing with each rack, and manually-operated means for rotating each gear.

14. In a grinding machine, a bed, a plurality of grinding tools, a plurality of rotary spindles for said tools, independent longitudinally-movable supports for said spindles by which each tool may be projected axially into desired relation to the work, means for locking or unlocking said supports simultaneously, and selective means for longitudinally moving any one of said supports independently of the others to advance or retract a desired tool.

15. In a grinding machine, a bed, a tool slide thereon, a plurality of supports mounted on said slide to move independently of each other and fixed against lateral movement with relation to said slide, means for automatically moving said tool slide longitudinally of said supports, and a rotary tool spindle carried by each support, substantially as set forth.

16. In a grinding machine, a bed, a tool holder mounted thereon, a plurality of grinding tools, a plurality of rotary tool spindles, a plurality of supports for said spindles mounted on said tool holder in laterally-fixed relation to said holder and said bed, said supports being selectively movable relatively to said tool holder, in any desired sequence, in lines parallel to the axes of said spindle to project the tool selected for operation, a rotary work holder, and instrumentalities for effecting a relative lateral movement of said work holder and said tool holder to bring into working relation the work and the projected tool.

17. In a grinding machine, a bed, a tool holder mounted thereon, a plurality of grinding tools, a plurality of rotary tool spindles, a plurality of supports for said spindles mounted on said tool holder in laterally-fixed relation to said holder and said bed, said supports being selectively movable relatively to said tool holder, in any desired sequence, in lines parallel to the axes of said spindle to project the tool selected for operation, a rotary work holder, instrumentalities for effecting a relative lateral movement of said work holder and said tool holder to bring into working relation the work and the projected tool, and automatic instrumentalities for effecting a relative length feed and a relative cross feed of said work holder and said tool holder.

18. In a grinding machine, a bed, a plurality of grinding tools, a plurality of rotary spindles therefor, a plurality of independent supports for said spindles in laterally-fixed relation to said bed but selectively movable longitudinally of said bed, independently of each other in any desired sequence, to project the tools selected for operation in said sequence, a rotary work holder, mechanism for effecting a relative cross movement of said work holder and said support for the tool selected for operation to bring said tool and the work into working relation, and supplemental automatic mechanism for automatically cross-feeding said work holder with diminishing speed.

19. In a grinding machine, a bed, a plurality of grinding tools, a plurality of rotary spindles therefor, a plurality of independent supports for said spindles in laterally-fixed relation to said bed but selectively movable longitudinally of said bed, independently of each other in any desired sequence, to project the tools selected for operation in said sequence, a rotary work holder, mechanism for effecting a relative cross movement of said work holder with respect to support for the tool selected for operation, to bring said tool and the work into working relation, and automatic instrumentalities for effecting a length feed of the tool support and a cross feed of the work holder, whereby the said grinding tool selected for operation automatically reduces the work by successive operations thereon.

20. In a grinding machine, a plurality of rotary spindles, bolsters for said spindles movable independently in the direction of the axes of said spindles, a tool carriage in which said bolsters are mounted, a handle on said tool carriage, and means actuated by said handle for locking or unlocking said bolsters to or from said carriage.

21. In a grinding machine, a plurality of rotary tool spindles, fast and loose pulleys on said spindles, said pulleys being oppositely arranged on said spindles, so that the fast pulley on one spindle is laterally in line with the loose pulley on the other, a driving belt, means for driving said belt, and means for shifting said belt axially of said spindles.

22. In a grinding machine, a plurality of rotary tool spindles, fast and loose pulleys on said spindles, said pulleys being oppositely arranged on said spindles, so that the fast pulley on one spindle is laterally in line with the loose pulley on the other, a driving belt, and means for shifting said belt axially of said spindles, in combination with a bed, a slidable carriage thereon in which said spindles are journaled, and an elongated belt driving drum mounted on said bed, said belt-shifting means being supported on and movable with said carriage.

23. In a grinding machine, a bed, a reciprocatory carriage, a plurality of rotary tool spindles on said carriage, a driving drum supported by the bed, a main driving belt for driving said spindles and movable along said drum, and selective means movable with said carriage and including a belt shifter on said carriage for causing said belt to effect the rotation of any one of said spindles while the others remain in a state of non-rotation.

24. In a grinding machine, a bed, a reciprocatory carriage, a plurality of rotary tool spindles on said carriage, a driving drum supported by said bed, a driving belt engaged with said drum and movable axially thereof as the carriage reciprocates, a fast and a loose pulley on each tool spindle, and a belt shifter on said carriage for shifting said belt.

25. In a grinding machine, a bed, a reciprocatory carriage, a plurality of rotary tool spindles on said carriage, an intermediate shaft, fast and loose pulleys on said spindles, a belt, fast and loose pulleys on said intermediate shaft, a belt between a fast pulley on the intermediate shaft and the pulleys on one of said spindles, a shifter for said belt, a driving drum supported by the bed, a main belt connecting said drum with pulleys on the intermediate shaft and on the other tool spindles, and a main belt shifter on said carriage.

26. In a grinding machine, a bed, a tool holder, a plurality of tool spindles, a plurality of supports selectively movable longitudinally independently of each other relatively to said tool holder to project any one of the tools and tool spindles but laterally fixed with reference to the bed, and spindle-rotating mechanism and instrumentalities for selecting the projected tool and spindle for actuation while the other tools and spindles remain quiescent.

27. In a grinding machine, a bed, a tool holder, a plurality of tool spindles, a plurality of supports selectively movable longitudinally independently of each other relatively to said tool holder to project any one of the tools and tool spindles but laterally fixed with reference to the bed, spindle-rotating mechanism and instrumentalities for selecting the projected tool and spindle for actuation while the other tools and spindles remain quiescent, a work holder, and automatic instrumentalities for effecting relative length and cross feeds of the work holder and the tool holder.

28. A grinding machine comprising a bed, a rotary grinding tool thereon, a rotary work holder thereon, instrumentalities for rotating the tool and the work holder, length-feeding mechanism by which the tool and the work holder are reciprocated one with respect to the other, cross-feeding mechanism by which the tool and the work holder are cross-fed one with respect to the other, and automatic mechanical means controlled by the cross-feeding mechanism for gradually decreasing the speed of the cross feed.

29. A grinding machine comprising a bed, a rotary grinding tool thereon, a rotary work holder thereon, instrumentalities for rotating the tool and the work holder, length-feeding mechanism by which the tool and the work holder are reciprocated one with respect to the other, cross-feeding mechanism by which the tool and the work holder are cross-fed one with respect to the other, one step on each said reciprocation, and automatic means for gradually decreasing the length of such steps.

30. A grinding machine comprising a bed, a rotary grinding tool, a tool slide, a rotary work holder, instrumentalities for rotating the tool and the work holder, mechanism for longitudinally reciprocating the tool slide, mechanism for automatically cross-feeding said work holder by successive steps, said mechanism comprising means for automatically varying the length of such steps.

31. A grinding machine comprising a bed, a rotary grinding tool, a tool slide, a rotary work holder, instrumentalities for rotating the tool and the work holder, mechanism for longitudinally reciprocating the tool slide, mechanism for automatically cross-feeding said work holder by successive steps, said mechanism comprising a cross-feed shaft, means controlled by the reciprocation of the tool slide for rotating said shaft one step at the end of each such reciprocation, and means for automatically diminishing the length of such steps as the cross feed progresses.

32. In a grinding machine, a tool, a rotary tool spindle, a tool carriage, a bed, a work holder, mechanism for relatively reciprocating the tool holder and the work holder to effect length feeds, mechanism controlled by said last-mentioned mechanism for effecting a cross feed by a relative step-by-step movement of the work holder and the tool holder, and automatic mechanism for varying the length of the steps of said cross-feeding movement.

33. In a machine of the character described, a work holder, a tool holder, and mechanism for effecting a relative cross feed of the work holder and the tool holder comprising a feed shaft, a pawl and ratchet for rotating said shaft with a step-by-step movement, and means for varying the length of the steps of said movement.

34. In a mechanism of the character described, a work holder, a tool holder, and mechanism for effecting a relative cross feed of the work holder and the tool holder comprising a feed shaft, a pawl and ratchet for rotating said shaft with a step-by-step movement, and mechanism connected to said ratchet to move therewith for automatically varying the length of the steps of said movement.

35. In a machine of the character described, a work holder, a tool holder, and mechanism for effecting a relative cross feed of said holders, comprising a feed shaft, a pawl and ratchet for imparting a step-by-step movement to said feed shaft, means for oscillating said pawl, and means for varying the length of the arc of oscillation of said pawl.

36. In a machine of the character described, a work holder, a tool holder, and mechanism for effecting a relative cross feed of said holders, comprising a feed shaft, a pawl and ratchet for imparting a step-by-step movement to said feed shaft, means for oscillating said pawl, and a cam rotated by said ratchet for varying the length of the arc of oscillation of said pawl.

37. In a machine of the character described, a work holder, a tool holder, and mechanism for effecting a relative cross feed of said holders, comprising a feed shaft, a pawl and ratchet for imparting a step-by-step movement to said feed shaft, means for oscillating said pawl, and selective mechanism actuated by said ratchet for rotating said feed shaft in either direction.

38. In a machine of the character described, a work holder, a tool holder, a plurality of tools on said holder adapted to be selected singly for operation on the work, and mechanism for effecting a relative cross feed of said holders, comprising a cross feed shaft, devices for rotating said shaft with a step-by-step movement, and instrumentalities corresponding in number to said tools and adapted to be selected for automatically varying the said step-by-step movement of the feed shaft, whereby a predetermined cross feed may be obtained for any particular tool.

39. In a machine of the character described, a work holder, a tool holder, a plurality of tools on said holder adapted to be selected singly for operation on the work, and mechanism for effecting a relative cross feed of said holders, comprising a cross feed shaft, a ratchet and pawl for rotating said shaft with a step-by-step movement, means for oscillating said pawl, a plurality of movable stops for limiting the arc of oscillation of said pawl, and cams actuated by the ratchet for moving said stops.

40. In a machine of the character described, a work holder, a tool holder, a plurality of tools on said holder adapted to be selected singly for operation on the work, and mechanism for effecting a relative cross feed of said holders, comprising a cross feed shaft, a ratchet and pawl for rotating said shaft, means for oscillating said pawl, a plurality of stops carried by said pawl and adapted to be selected for action, and a plurality of stops relatively to which the pawl is movable for coaction with said first-mentioned stops.

41. In a machine of the character described, a work holder, a tool holder, a plurality of tools on said holder adapted to be selected singly for operation on the work, and mechanism for effecting a relative cross feed of said holders, comprising a cross feed shaft, a ratchet and pawl for rotating said shaft, means for oscillating said pawl, a plurality of stops carried by said pawl and adapted to be selected for action, a plurality of stops relatively to which the pawl is movable for coaction with said first-mentioned stops, and means actuated by the ratchet for moving said first-mentioned stops, whereby the arc of oscillation of said pawl is varied in length.

42. In a machine of the character described, a bed, a tool holder, a table, a work holder on said table, a vertical pivot connecting the table with the bed, so that the work holder may be moved about the axis of said pivot, and automatic mechanism for cross-feeding said work holder on the said table.

43. In a machine of the character described, a bed, a work holder, a tool holder, a table, on which the work-holder is mounted, a vertical pivot connecting the table with the bed about which the table and work-holder may be moved, a cross feed shaft for cross-feeding said work support on said table, and mechanism for automatically actuating said shaft, comprising an actuator on said table, and power-transmitting mechanism on the bed connected to said actuator.

44. In a machine of the character described, a bed, a work holder, a tool holder, a table, a vertical pivot connecting the table with the bed, a cross feed shaft for cross-feeding said work support on said table, and mechanism for automatically actuating said shaft, comprising an actuator on said table, a power-transmitting shaft on the bed, and a universal joint between said actuator and said shaft.

45. In a machine of the character described, a bed, a tool holder longitudinally movable on said bed, length-feeding mechanism for said tool holder, a work holder, a table therefor pivotally connected to the bed by a vertical axis whereby it may be located in different angular positions relatively to said bed, and automatic mechanism for cross-feeding said work holder on said table irrespective of the angular position of said table.

46. In a machine of the character described, a bed, a tool holder thereon, automatic mechanism for length-feeding said tool holder, a table connected to said bed by a vertical pivot and adapted to be located in different angular positions with respect to the bed, a work holder on said table, automatic mechanism for cross-feeding said work holder on said table, stop-controlled knock-off mechanism for controlling the length-feeding mechanism, and means by which said knock-off mechanism causes the operation of the cross-feeding mechanism.

47. In a machine of the character described, a bed, a tool holder thereon, automatic mechanism for length-feeding said tool holder, a table connected to said bed by a vertical pivot and adapted to be located in different angular positions with respect to the bed, a work holder on said table, automatic mechanism for cross-feeding said work holder on said table, stops on the tool holder, a member on the bed operated by engagement with said stops, and instrumentalities connected with said member for controlling the length-feeding mechanism and actuating the cross-feeding mechanism.

48. In a machine of the character described, a bed, a tool holder thereon, automatic mechanism for length-feeding said tool holder, a table connected to said bed by a vertical pivot and adapted to be located in different angular positions with respect to the bed, a work holder on said table, automatic mechanism for cross-feeding said work holder on said table, said cross-feeding mechanism comprising an actuator on said table, and a rock shaft connected thereto and mounted on the bed, a stop, and knock-off mechanism for controlling the length-feeding mechanism and having means for rocking said shaft.

49. In a machine of the character described, comprising a bed, a tool holder, mechanism for length-feeding said tool, comprising a clutch, a clutch-operating lever, stops on said tool holder, a rocking element on said bed operated by said stops, and connections between said element and said clutch for shifting the latter.

50. In a machine of the character described, the combination with the bed, the tool holder having a plurality of tools thereon, and feeding mechanism for said tool holder, of instrumentalities for controlling the operation of said feeding mechanism, comprising a plurality of pairs of stops on the tool holder, a rock shaft on the bed having a projection movable axially thereof into alinement with any pair of stops.

51. In a machine of the character described, the combination with the bed, the tool holder having a plurality of tools thereon, and feeding mechanism for the tool holder including a clutch, of instrumentalities for shifting said clutch, comprising a clutch lever, a rock shaft, a lever on said rock shaft, said levers overlapping and having coacting stops whereby the second-mentioned lever moves a predetermined distance before it permits movement of the first-mentioned lever, and springs interposed between said levers and adapted to store power when the said second-mentioned lever is actuated to move the first-mentioned lever with a quick movement.

52. In a machine of the character described, a bed, a tool holder thereon, a table pivoted to the bed by a vertical pivot, a work holder on said table, and clamping means remote from said pivot for securing said table to said bed to prevent relative oscillatory movement thereof.

53. In a machine of the character described, a bed, a tool holder thereon, a table pivoted to the bed by a vertical pivot, a work holder on said table, a segment on said table concentric with said pivot, and means on said table for engaging said segment and locking it to said bed.

In testimony whereof I have affixed my signature, in presence of two witnesses.

WILLIAM LE ROY BRYANT.

Witnesses:
GEO. A. PERRY,
FRED P. LOVEJOY.